(12) United States Patent
Remy

(10) Patent No.: US 7,026,570 B2
(45) Date of Patent: Apr. 11, 2006

(54) TRANSPORTABLE, SELF-CONTROLLED PLASMA NEUTRALIZATION OF HIGHLY TOXIC BIO-CHEMICAL WASTE AND METHOD THEREFORE

(75) Inventor: Roger Remy, Albuquerque, NM (US)

(73) Assignee: Aerospace Consulting Corporation Spain, S.L., Barcelona (ES)

(*) Notice: Subject to any disclaimer, the term of this patent is extended or adjusted under 35 U.S.C. 154(b) by 387 days.

(21) Appl. No.: 10/115,813

(22) Filed: Mar. 28, 2002

(65) Prior Publication Data
US 2003/0187318 A1 Oct. 2, 2003

(51) Int. Cl.
 *B23K 10/00* (2006.01)
(52) U.S. Cl. .................... 219/121.36; 219/121.43; 219/121.48
(58) Field of Classification Search ........... 219/121.36, 219/121.52, 121.48, 121.43, 121.44, 121.41, 219/121.59, 75; 373/18–22; 588/900; 110/240–246, 110/346
See application file for complete search history.

(56) References Cited

U.S. PATENT DOCUMENTS

| | | | |
|---|---|---|---|
| 4,909,164 A | | 3/1990 | Shohet et al. |
| 5,134,946 A | | 8/1992 | Poovey |
| 5,288,969 A | | 2/1994 | Wong et al. |
| 5,410,121 A | | 4/1995 | Schlienger |
| 5,673,635 A | * | 10/1997 | Fowler ..................... 110/345 |
| 6,355,904 B1 | * | 3/2002 | Batdorf et al. ......... 219/121.59 |
| 2002/0040889 A1 | | 4/2002 | Markunas et al. |

FOREIGN PATENT DOCUMENTS

| | | |
|---|---|---|
| WO | WO-91/04104 A1 | 4/1991 |
| WO | WO-97/496541 A2 | 12/1997 |
| WO | WO-99/10086 A1 | 3/1999 |

* cited by examiner

*Primary Examiner*—Mark Paschall
(74) *Attorney, Agent, or Firm*—Darby & Darby

(57) ABSTRACT

The invention is comprised of an apparatus in form of a single transportable unit, a chamber for the main treatment, with the necessary dimensions to fit the canister drum containing the waste which is to be eliminated, and with the capacity to create and manipulate the direction of the RF plasma flows at a temperature higher than 10.000° K so that it totally surrounds the container, in order to carry out its complete dissociation. The chamber has the capacity to individually collect and select the various materials by species resulting from the dissociation, transporting them by means of the plasma flow generated by an argon gas or other gasses which are injected into the chamber at the far end, where the gas conditioning/separator is situated. This chamber which carries out the main treatment process has embedded antennas which emit the radio frequency which produces and maintains the plasma core and is associated to:
a) A robotic unit to load the waste drums/canisters into the main chamber.;
b) A RF generator unit;
c) A main chamber cooling unit and peripherals;
d) Control and monitoring unit of the entire process and
e) a power generator with the peripherals to regulate its functions
f) Database for product compatibility/inventory The invention extends as well to the method for the elimination of waste.

16 Claims, 20 Drawing Sheets

Figure 2:
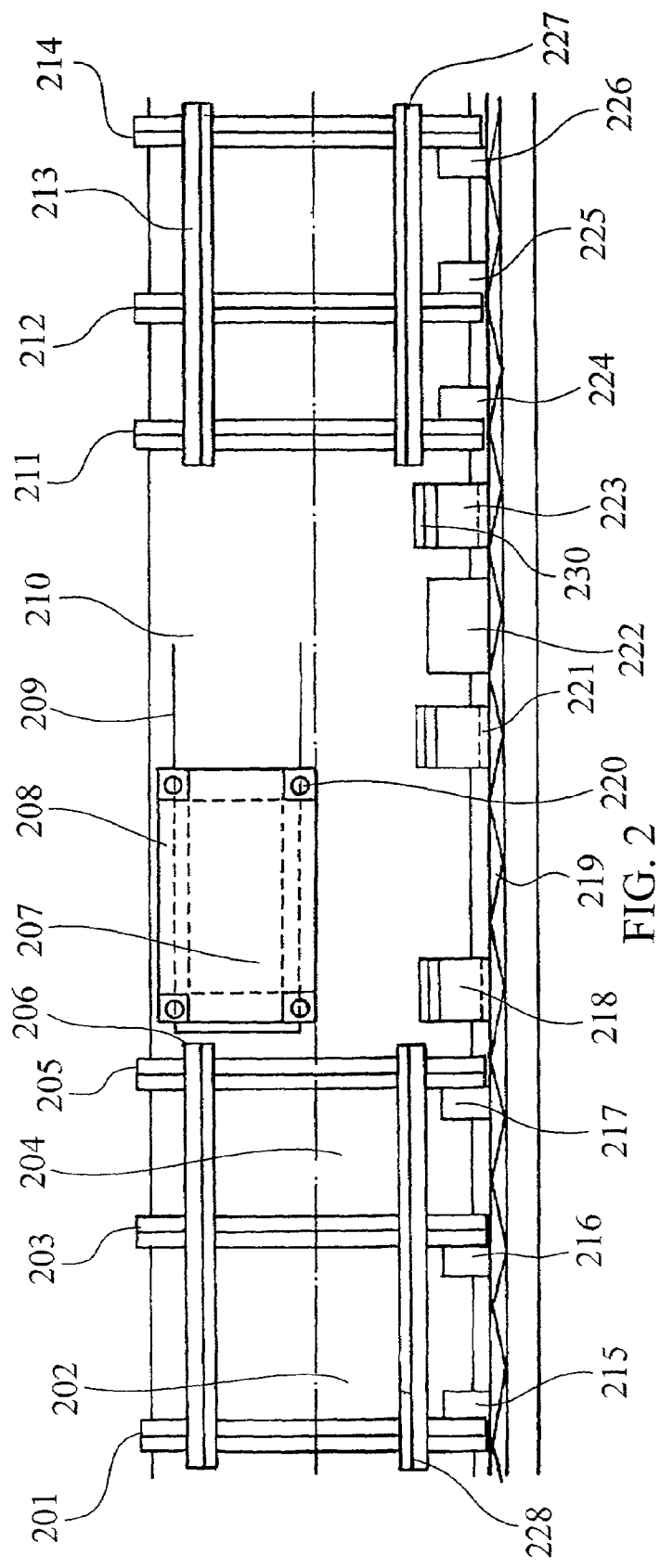

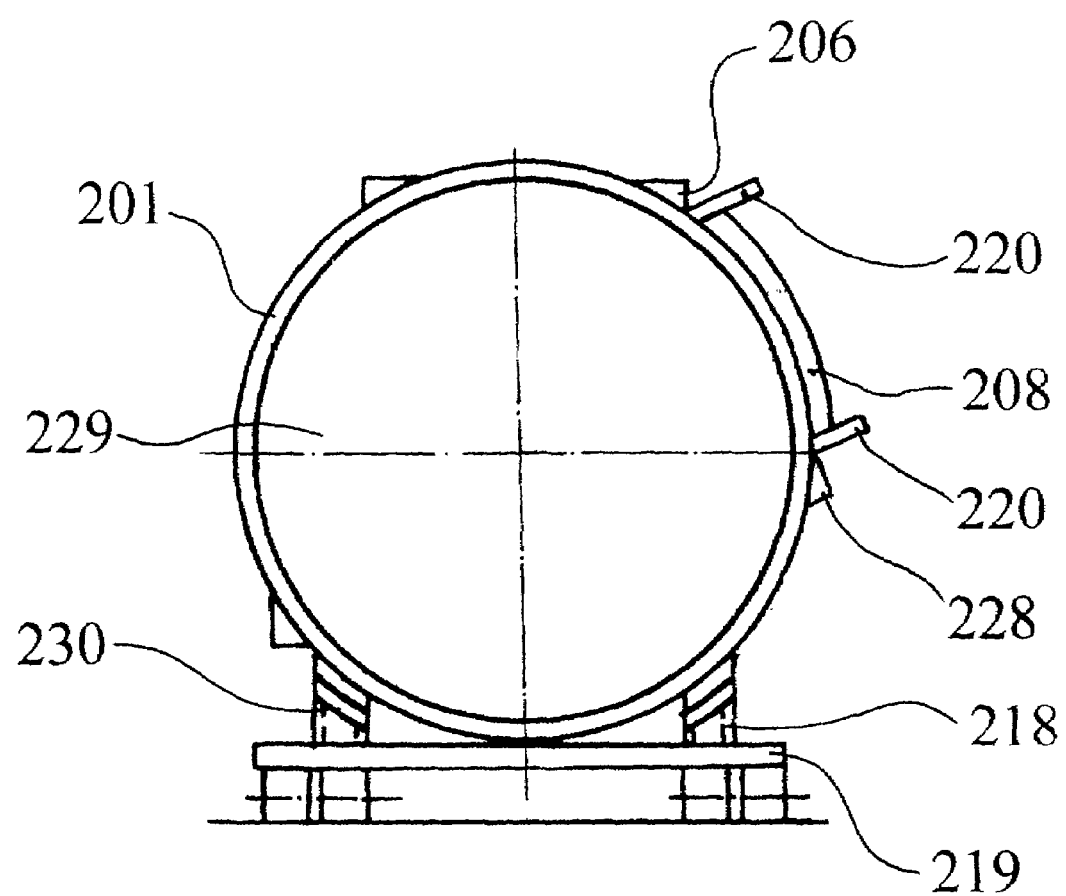
FIG. 2.1

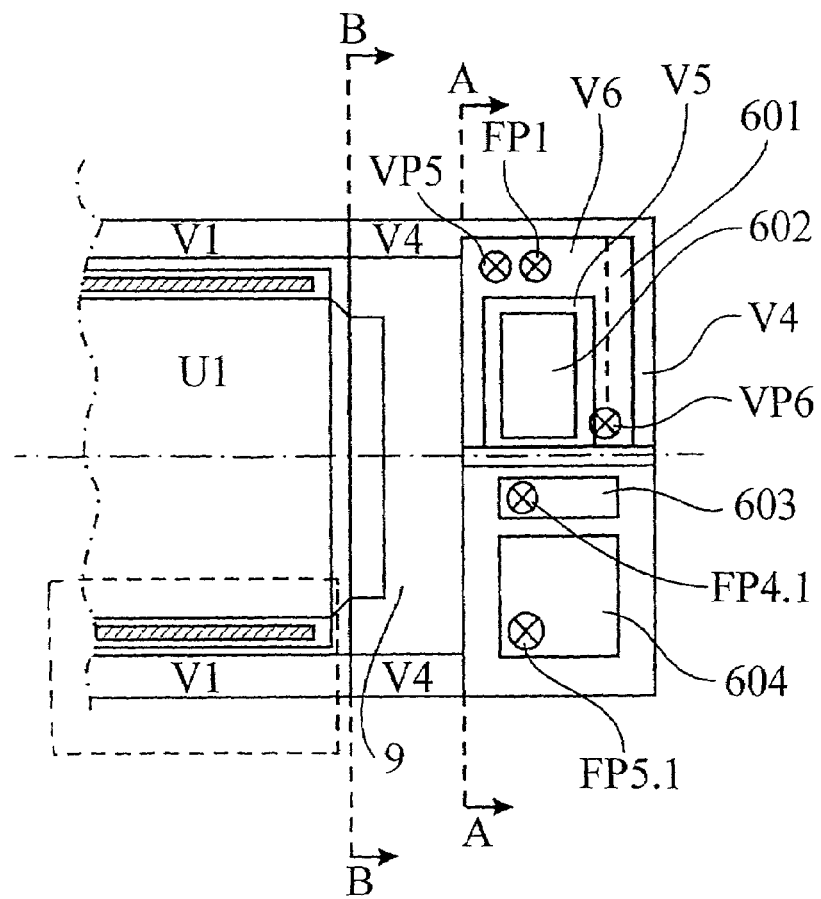
FIG. 6
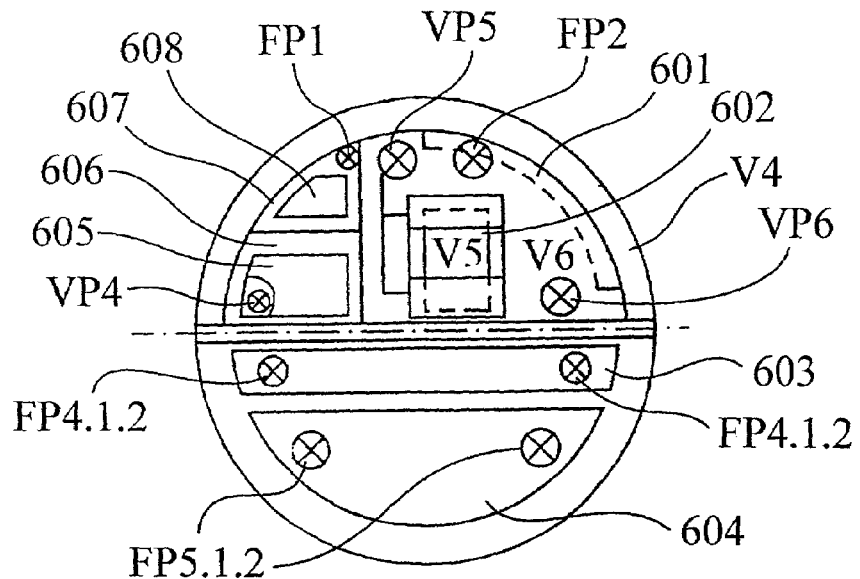
FIG. 6 BIS

TRANSPORTABLE, SELF-CONTROLLED PLASMA NEUTRALIZATION OF HIGHLY TOXIC BIO-CHEMICAL WASTE AND METHOD THEREFORE

This invention refers to a procedure and apparatus designed to eliminate and destroy a diverse range of highly toxic waste, particularly waste stored in containers such as 55/65-gallon drums or any other metallic container.

At present, many processes and apparatuses for the elimination of various types of toxic waste exist. For example, there are apparatuses designed for the elimination of waste by pyrolisis, subjecting the waste to very high temperatures which results in transforming them into harmless compounds and gasses, which in many cases still presenting a high danger for the environment on the actual standards, depending on the efficiency of the process. For these reasons, these applied techniques, devices, or treatment facilities in operation are subject to strict laws and regulations. Other systems or methods of elimination are based in exposing the toxic waste to either a plasma arc (also called resistive plasma), or an RF (radio frequency) also called inductive plasma. In the first case, some notable disadvantages have been observed, like the erosion of the electrodes or such, thus, creating maintenance issues, as well as the plasma core control, in a mean of: its shape, its temperature, and its homogeneity. The plasma arc technique is mainly utilised for a so-called molten process, which requires substantial and permanent infrastructure. In a second case, induced plasma techniques are not yet utilised to treat a large amount of waste in one lump. These techniques also requires large infrastructure. In any case, there are no existing techniques capable of neutralizing a 55/65-gallon drum in one shot, safely and in a closed loop, without exposing the environment to contamination.

Several studies have examined the generation of plasma RF coupling. RF plasma coupling is a well known phenomenon which has been studied since 1947, for various applications ranging from fusion generation, propulsion, metallurgy, coating, striping, ceramic and, more recently for waste destruction at high temperature. RF was used either or both for inducting plasma, or sometimes, for confining (electrical double layer effect, EDL). The inventor of this patent application, based on state of the art techniques, have proceeded to a study of RF coupled plasma at high temperature, using simulation models of several non-linear physical phenomenon's. The modelling of the plasma required a two-fluid description with associated solution of the Maxwell equations.

Following these studies, the inventor also conducted with positive results a preliminary proof of the concept, at bench level to determine: A) the feasibility; B) basic dimentioning of the apparatus, object of this patent, which includes (but not limited) the plasmagene gas volume and flow, the plasma core by itself, its flow, shape and control, various coolant fluids necessary for the methods, power requirement; C) other apparatus peripheral equipments; D) various type of materials to be utilised for the manufacture of the different apparatus components, as mentioned herein in the submission of this patent application.

The objective of this invention is to apply a method of elimination of highly toxic waste packaged into 55/55-gallon drum (approximately 200 to 250 litres) by a means of a high temperature RF coupled plasma, in only one shot, in one single chamber and such, as a transportable device. In addition to the problem complexity, it is to mention that these drums/canisters where commonly used by military and civilian, who where handling, packaging, and storing these type hazardous products or waste. Some of these drums/canisters made of steel, which has not been treated for a very long-term storage, are now getting brittle. This critical and poor condition situation raises the issues of transportation risk factor of such drums and their very hazardous content. As examples, we can cite some of these products, which are: polychlorinated dibenzo dioxins/furans (PCDD-PCPF), polychlorinated biphenyls (PCB) and others, such as military gases like neuro toxic gas and other bio-chemical warfare compounds. Consequently, these drums to be transported will require special authorization. To implement such authorization, become then extremely complex and expensive. Moreover, it could take years before being approved. At the moment, no methods or apparatuses exist for the rapid and safe elimination of these drums, which actually require large and costly installations for their storage, which also present a serious liability. In the light of this, the objective of the invention is to solve said serious problem represented by the existence of such large quantity of toxic and/or dangerous materials stored in various locations, in many countries. Other factors contributing to the problem must be also addressed: waste, the age of the stockpile, their location, and their integrity, constitute the fact that these drums cannot be handled easily: some of their inventory are very inaccurate, particularly the description of their contents. Thus, only a fully transportable, automated device, capable of handling, identifying, and inventorying (prior to treatment), and destroying the said drum, can operate at the proper safety level.

With the objective to solve the above-mentioned problems, the inventor, after a long process of investigation, research and development, has come up with this invention which consists of a method based on the specific use of RF plasma coupling at a high temperature, controlled by magneto hydrodynamic (MHD), for the complete destruction of toxic and/or dangerous waste so packaged, reducing it to elementary species which are completely separated and colleted, in a closed loop system and in one single operating chamber.

Simultaneously, the inventor has developed an apparatus, which permits the application of the above-mentioned method of using RF plasma coupling at a high temperature applied to the entire drums without the need to transfer, manipulate, or pre treat their content. In addition, in this waste neutralization procedure, object of this patent, it is not required to crush or slice the drum as it is in use in some other systems currently known. One part of this invention consists of a method to capture and separate the chemical elements at the molecular level, which result from the high temperature dissociation process of the waste in such a way to avoid their recombination.

Another of the objectives of this invention is for the apparatus object of the patent, that it will be transportable prior to perform the destruction of the said drum/canister, in such a way to avoid the difficulties involved in the handling of toxic and/or dangerous waste between their storage location and the specific location of their destruction, as it is required at present. This invention discloses an apparatus capable of carrying out the process, object of this invention, of completely destroying toxic and/or dangerous waste by dissociation at the molecular level, which is transportable either by airplane, rail, truck or other means, to the location in which the toxic and/or dangerous waste to be destroyed are stored. It is also to mention that, by destroying the wastes so packaged in the said drums, it is anticipated to drastically diminish the cost of the waste destruction, as it will solve also the quasi insoluble problem of transportation and its associated danger for the environment.

In developing this invention, the inventor have considered various issues determined from earlier research and development work, which include the following:

1. Residence time of the molecules of the material to be destroyed within the plasma core. It is critical to ensure that the toxic components are completely dissociated (to a concentration of less than 1 ppb) and that, any recombination is occurring during the process of neutralisation.
2. Flow pattern of the toxic material. It is necessary for the toxic material, after the drum is opened and dismantled, to go through the plasma vortex and not around it. Therefore, it is necessary to have the capability to manipulate and control the flow of the toxic or dangerous material in dissociation process, within the plasma core.
3. The effect of the residence time: the so-called Residence Time is the time which the Material to be dissociated remains exposed to the plasma It is necessary for the thermal process of the plasma to be long enough in order to vaporise/dissociate the drum/canister and its contents. Furthermore, the plasma core has to reach temperatures not lower than 10,000 K. It is then a question of the positioning of the canister at the appropriate geometry within the plasma core vortex.
4. Efficiency of the plasma and its control. In order to maintain the plasma core at a high temperature (higher than 10.000° K), it will be critical to keep plasma losses to a minimum, to maximise the electric thermal conversion efficiency, and to maximise the efficiency of the molecular decomposition, that is the residence time.
5. Material issues: As for the characteristics of the walls of the chamber, the so-called inner walls, different active elements such as the antenna and their cooling devices, will be embedded in the said walls. Therefore the said material must be transparent to RF propagation. This material must also be able to resist the hostile environment created by the molecular dissociation process reaction in high temperature (high temperature chemistry phenomenon). Beryllium oxide (BeO) has been selected as the material, although other materials could be selected.

The apparatus destined to carry out this invention will be transportable and will have the ability to neutralize drums of an approximate capacity of between 240 and 350 litres (55/65 gallons) or any other type of metallic container in a single chamber to be designated Neutralization or dissociation chamber in one time, or one "shot", by using the RF coupling plasma coupling technique, so that the plasma can engulf the drum or similar container and its contents. It will also possess means to collect, recycle or neutralise any secondary recombination in a closed loop system, inside the above-mentioned unique chamber, understanding that the whole neutralisation process should be performed in compliance with pertinent safety regulations. In order to carry out this neutralisation process, the apparatus, object of this invention, requires different techniques or methods integrated in various elements or units, all of which will have different functions and which can be numbered in the following way:

Unit 1: Main unit, which consists of the neutralization chamber.

Unit 2: Cooling unit amongst which functions are to maintain the temperature gradient of the RF antenna and other elements below 600° C., preferably at the levels of approximately 500° C.
Unit 3: Radio frequency generator designed to generate enough power at the appropriate frequency to sustain the plasma core vortex.
Unit 4: Robot unit designed to recognise and select the drum or container to be neutralised as well as other functions such as handling, transport and sampling.
Unit 5: Power generator designed to provide enough power for the entire system of the invention.
Unit 6: Air intake and air intake regulator.
Unit 7: Exhaust fumes regulator from the power generator.
Unit 8: Power generator fuel tank and fuel supply unit.
Unit 9: Main control/monitoring unit.
Unit 10: Monitoring/supplier unit.
Unit 11: Plasma dopant supplier unit.
Unit 12: Plasmagene gas supplier unit.
Unit 13: Coolant tank to store, maintain and deliver cooling fluid to the various cooling units.
Unit 14: Back-up power generator.
Unit 15: Analysis unit/sampling chamber, designed to carry out the sample analysis of the drums containing the products to be destroyed prior to treatment, into an hermetically sealed and secured chamber.

To further comprehension, a series of drawings have been included, described here below.

Figure 1:
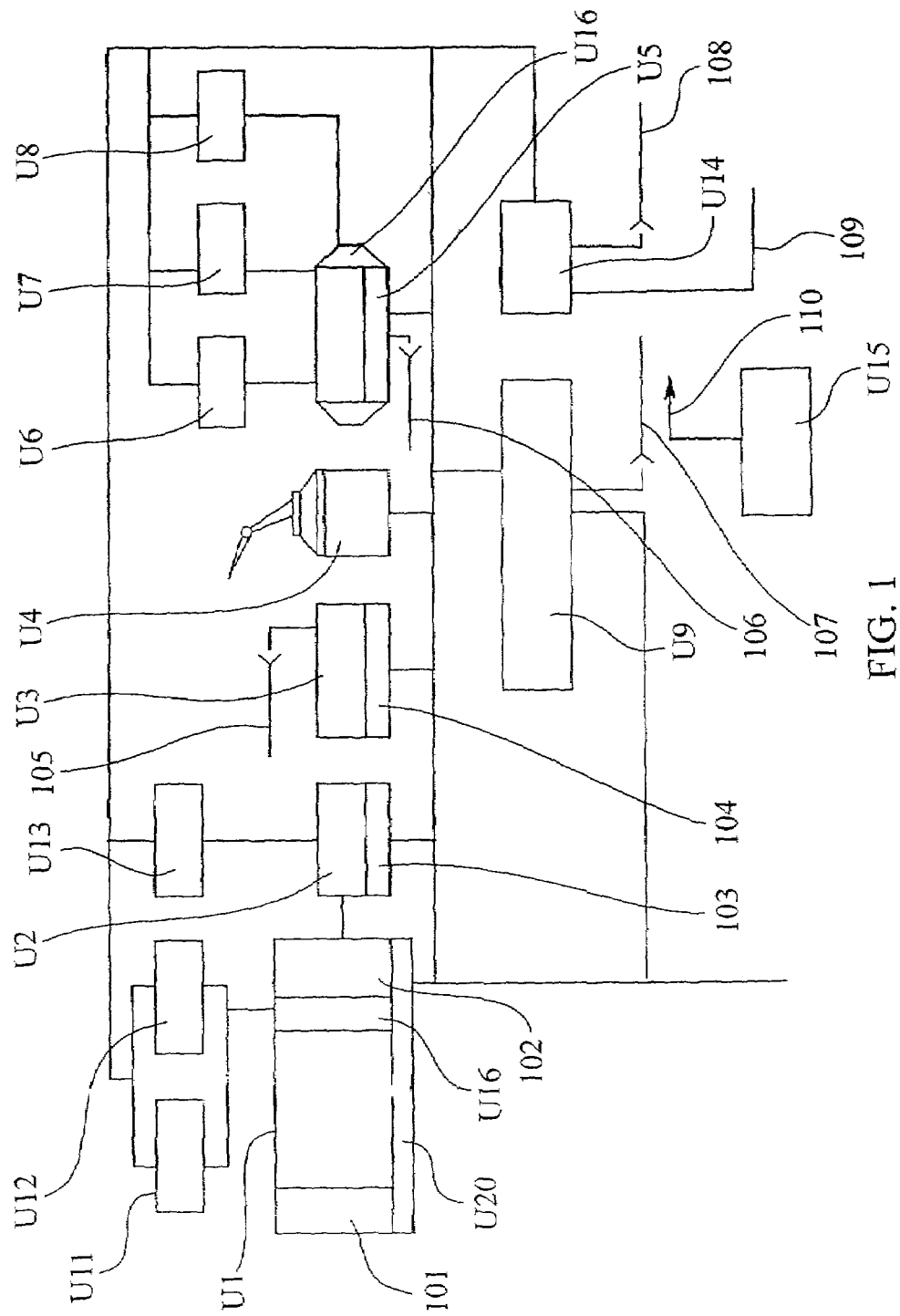

FIG. 1: Block diagram representation of all the apparatus components, which combined, make up this invention.

FIG. 2: External over view of the main chamber of the apparatus.

FIG. 2.1: Cross-section of the apparatus as shown in FIG. 1.

Figure 3:
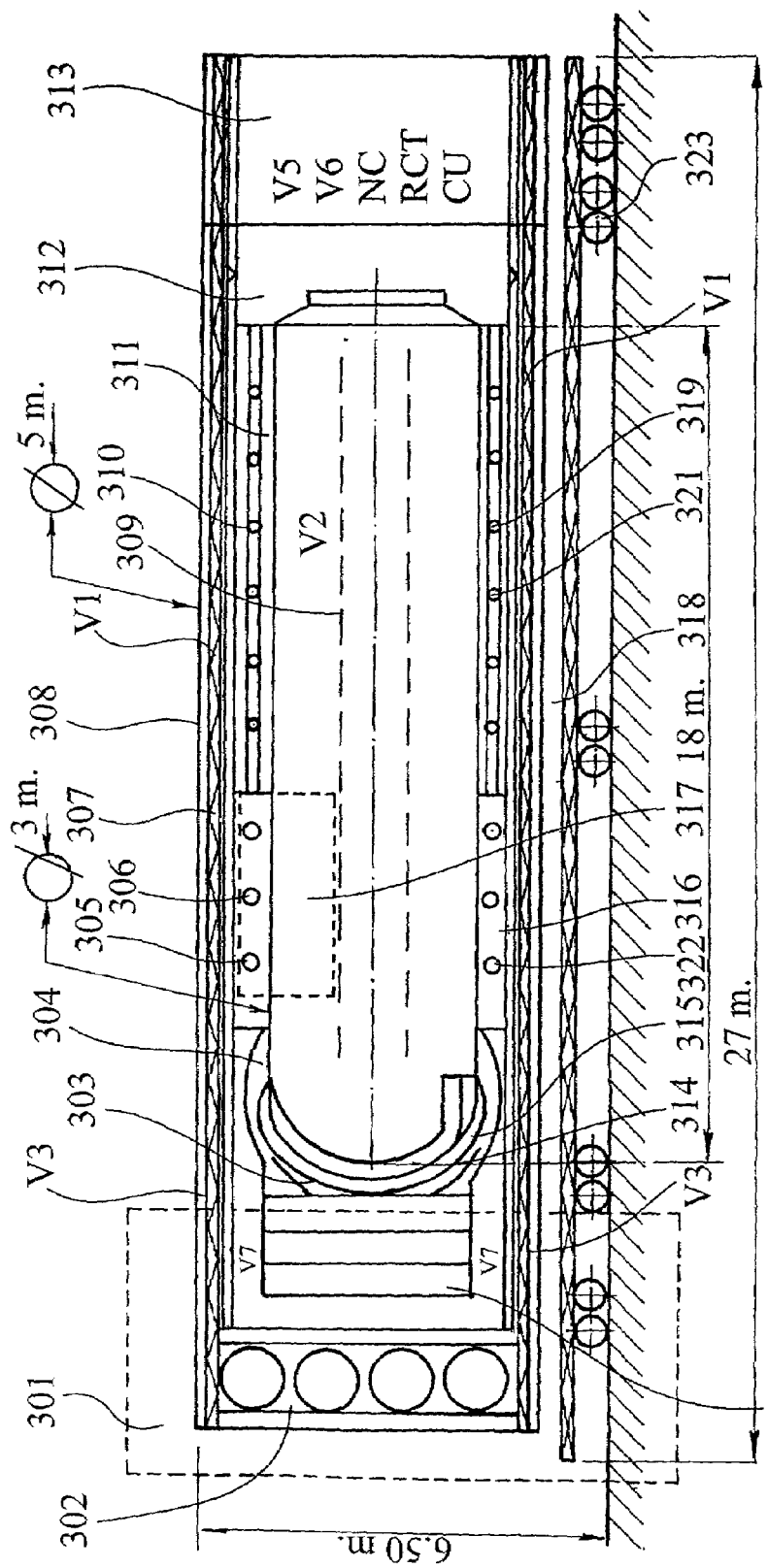

FIG. 3: Internal longitudinal diagram of the apparatus, showing its various compartments.

Figure 4:
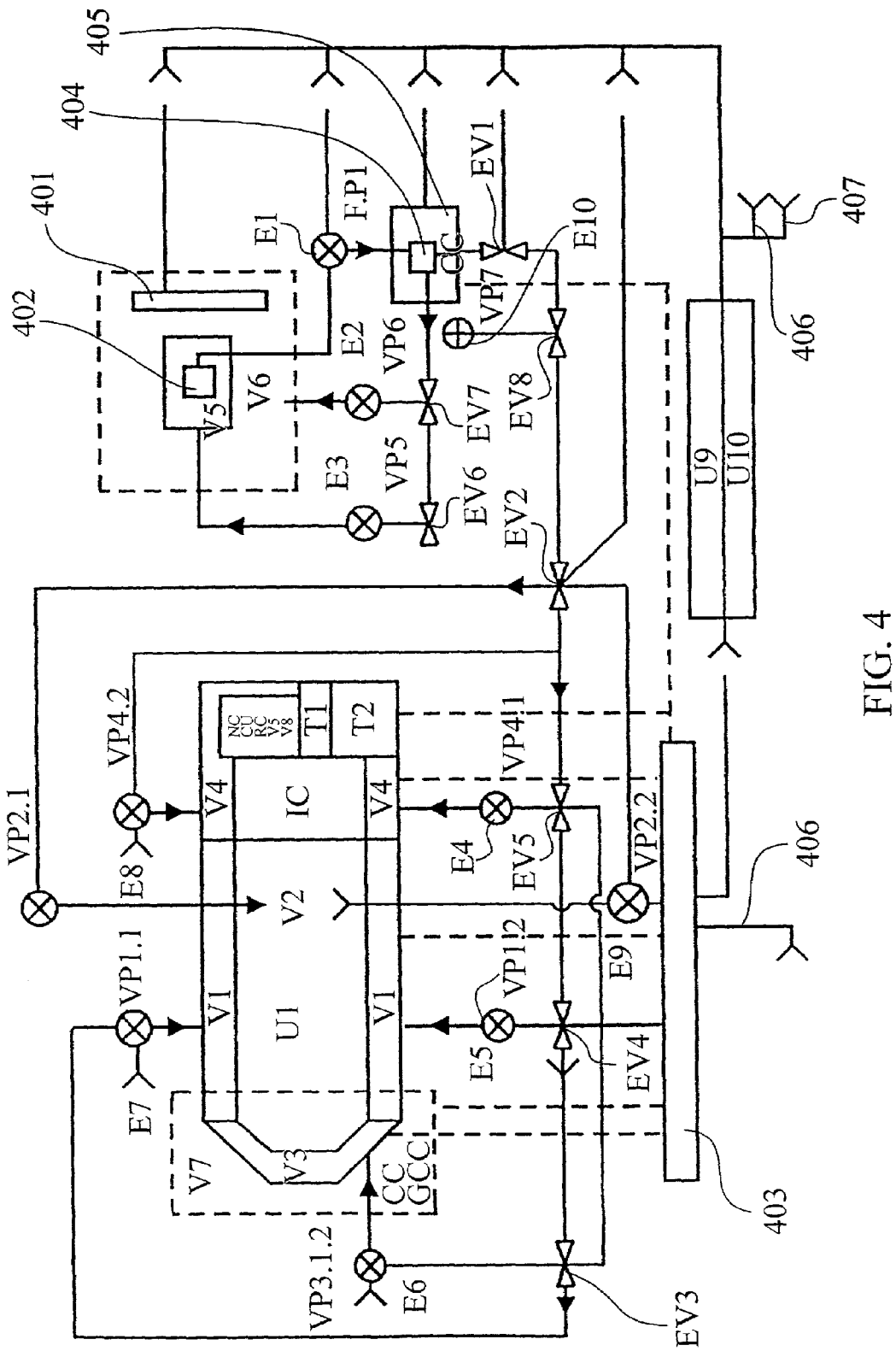

FIG. 4: General block diagram showing the vacuum lines.

Figure 5:
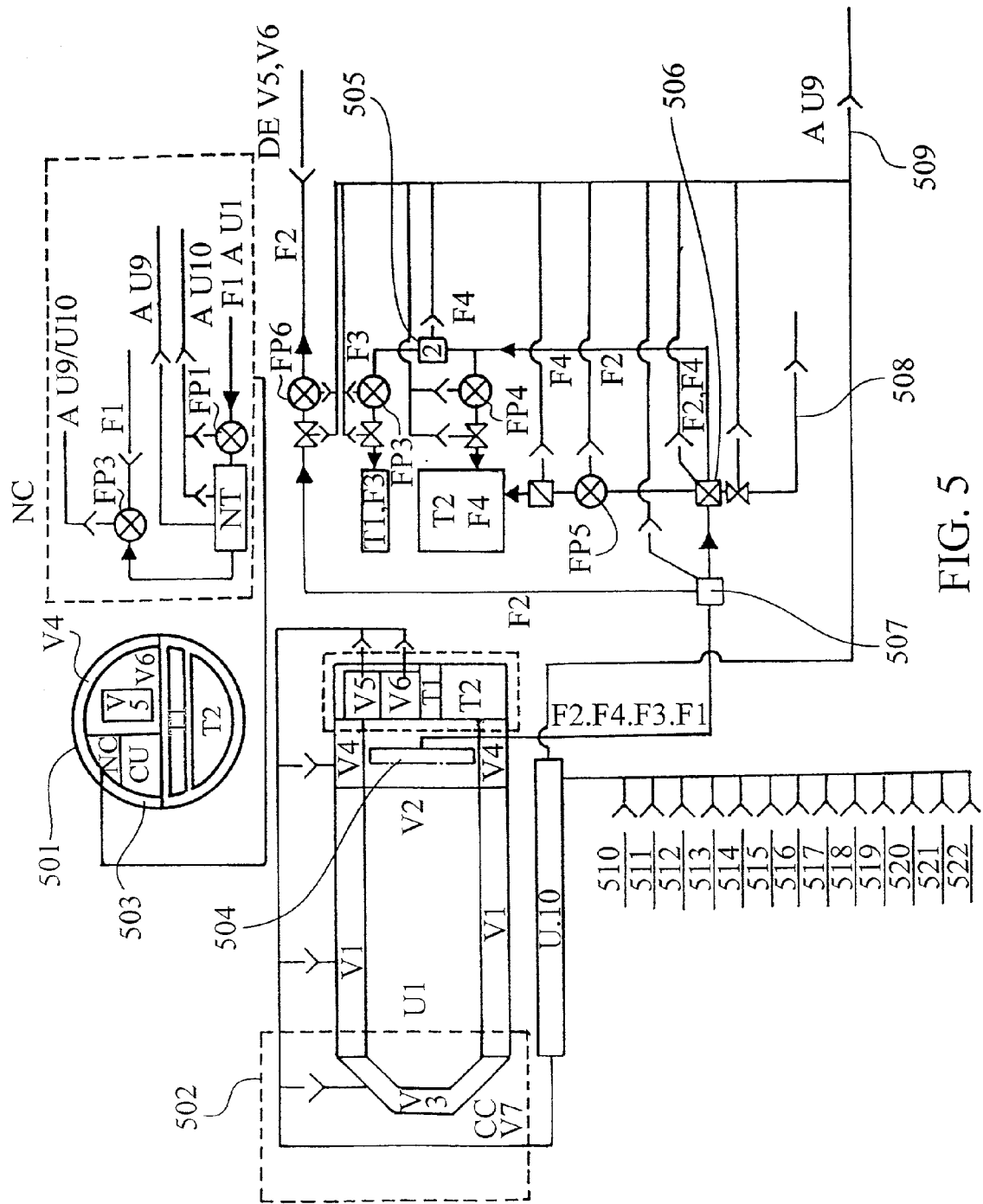

FIG. 5: General diagram showing the basic circuitry which monitors and controls the gases and fluids.

FIG. 6: Schematic view of the rear compartment.

FIG. 6 bis: Cross section of the rear compartment.

Figure 7:
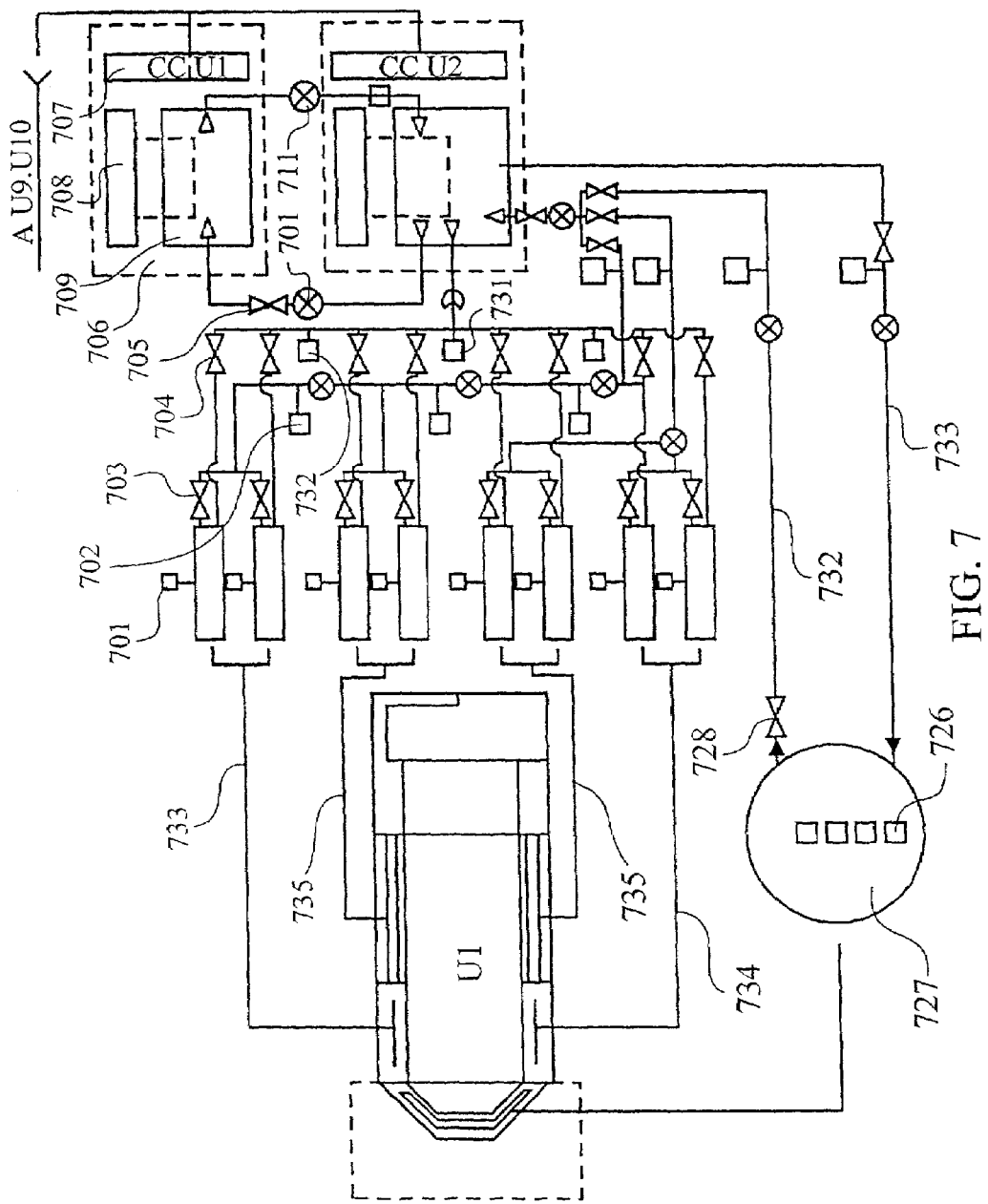

FIG. 7: General diagram of the basic cooling circuitry.

Figure 8:
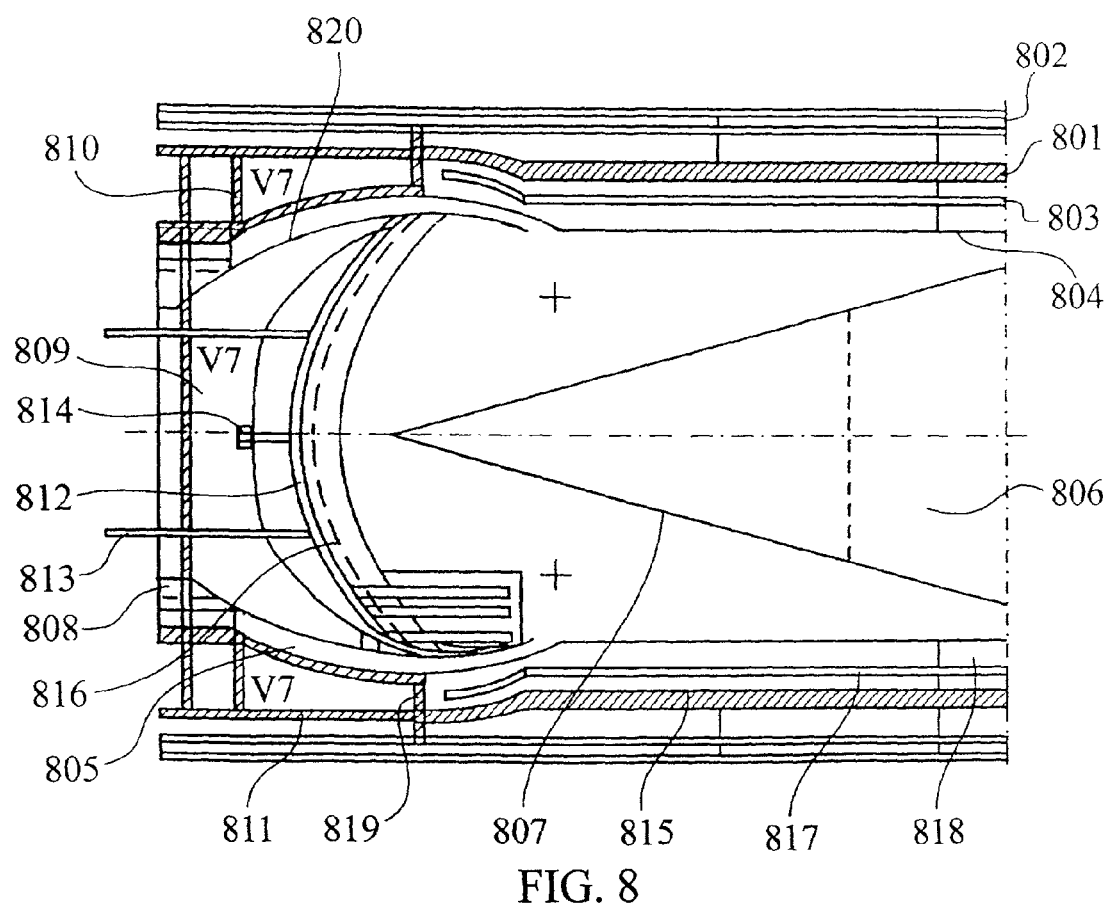

FIG. 8: Schematic view of the gas collector/separator unit.

Figure 9:
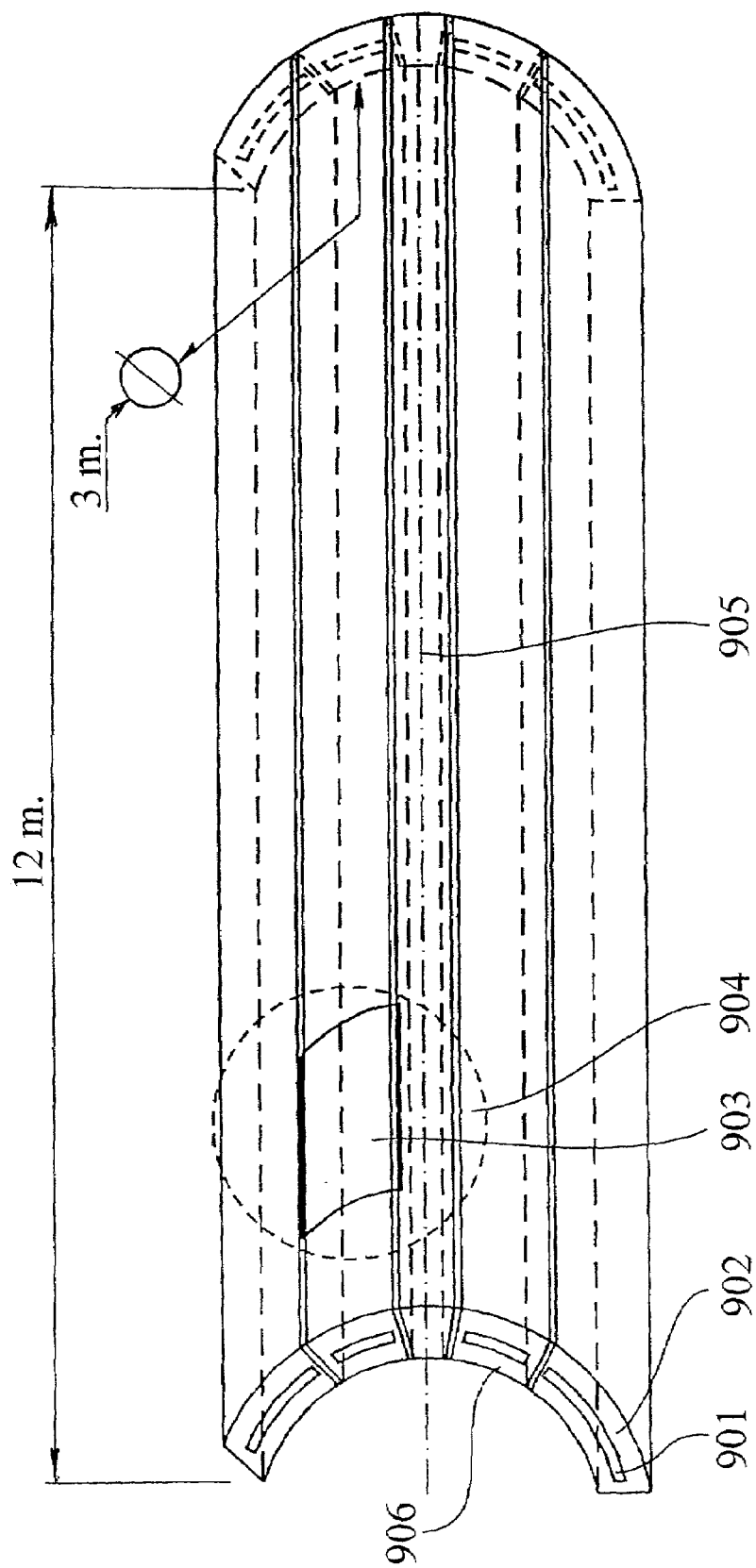

FIG. 9: Perspective of the inner wall module configuration of the chamber, the embedded R F antenna, the hatch and magnetic rail.

Figure 10:
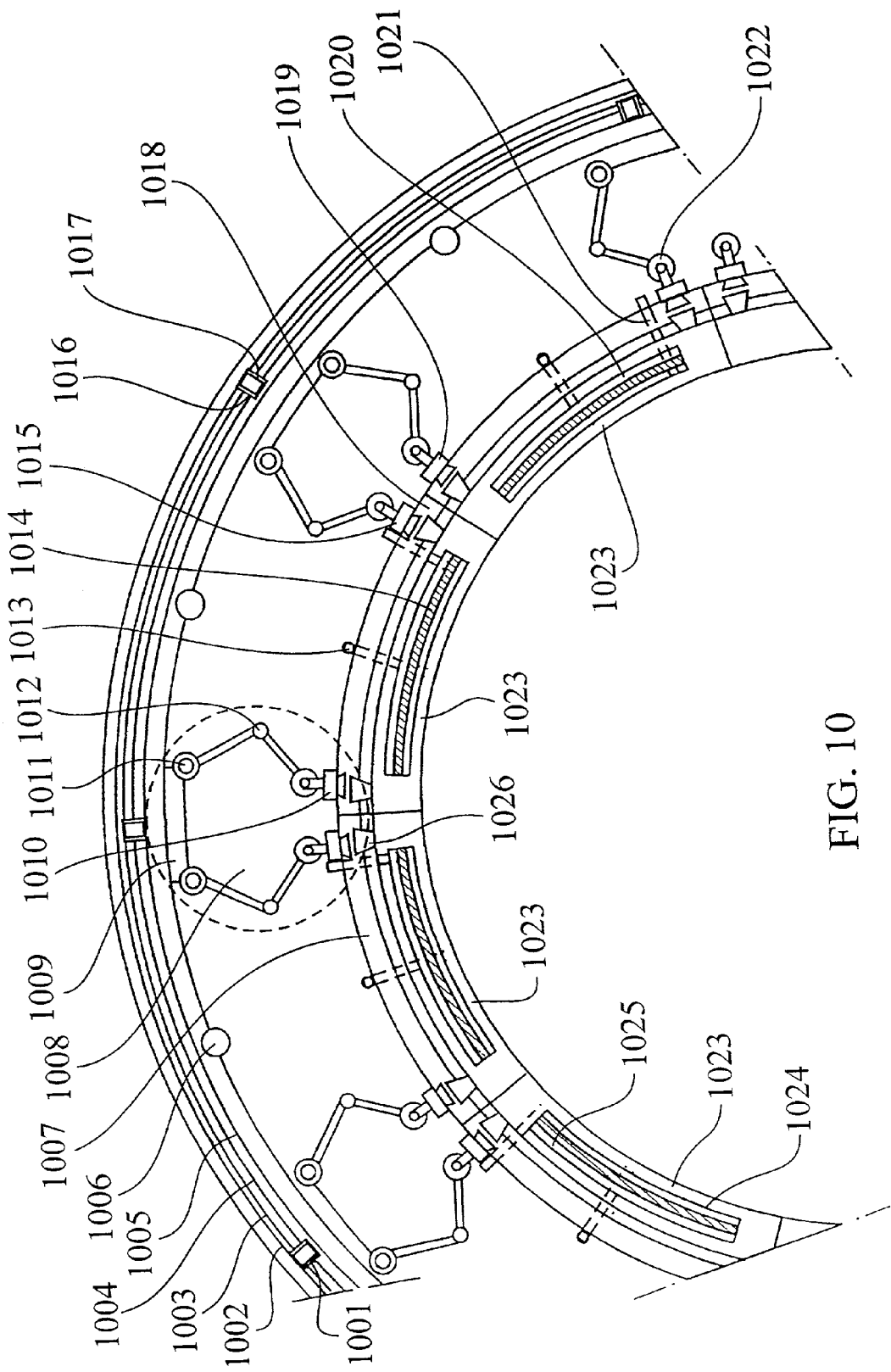

FIG. 10: Detailed cross section of the structure of the main chamber, its inner wall and external structure.

Figure 11:
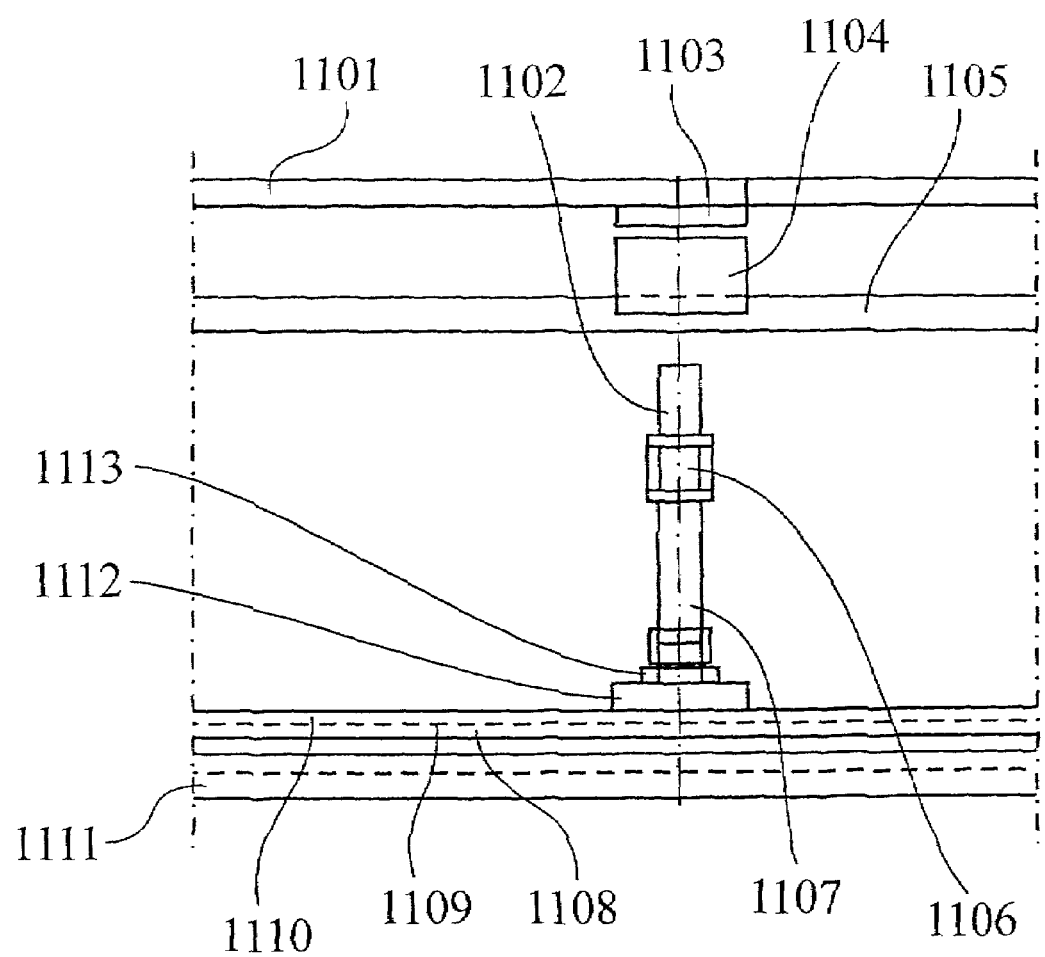
Figure 12:
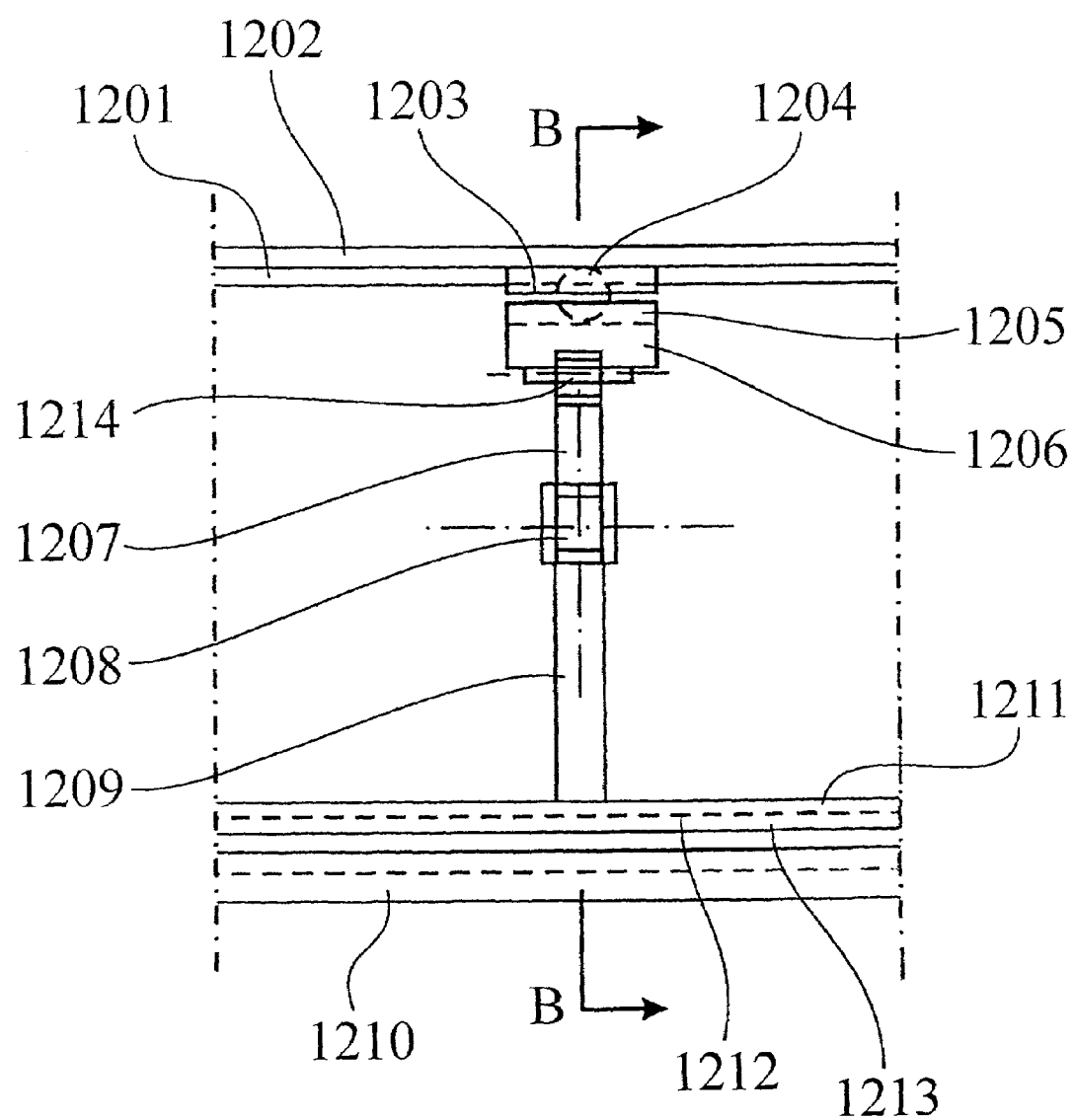

FIGS. 11 and 12: Details of the frame structure of the attachment of such.

Figure 13:
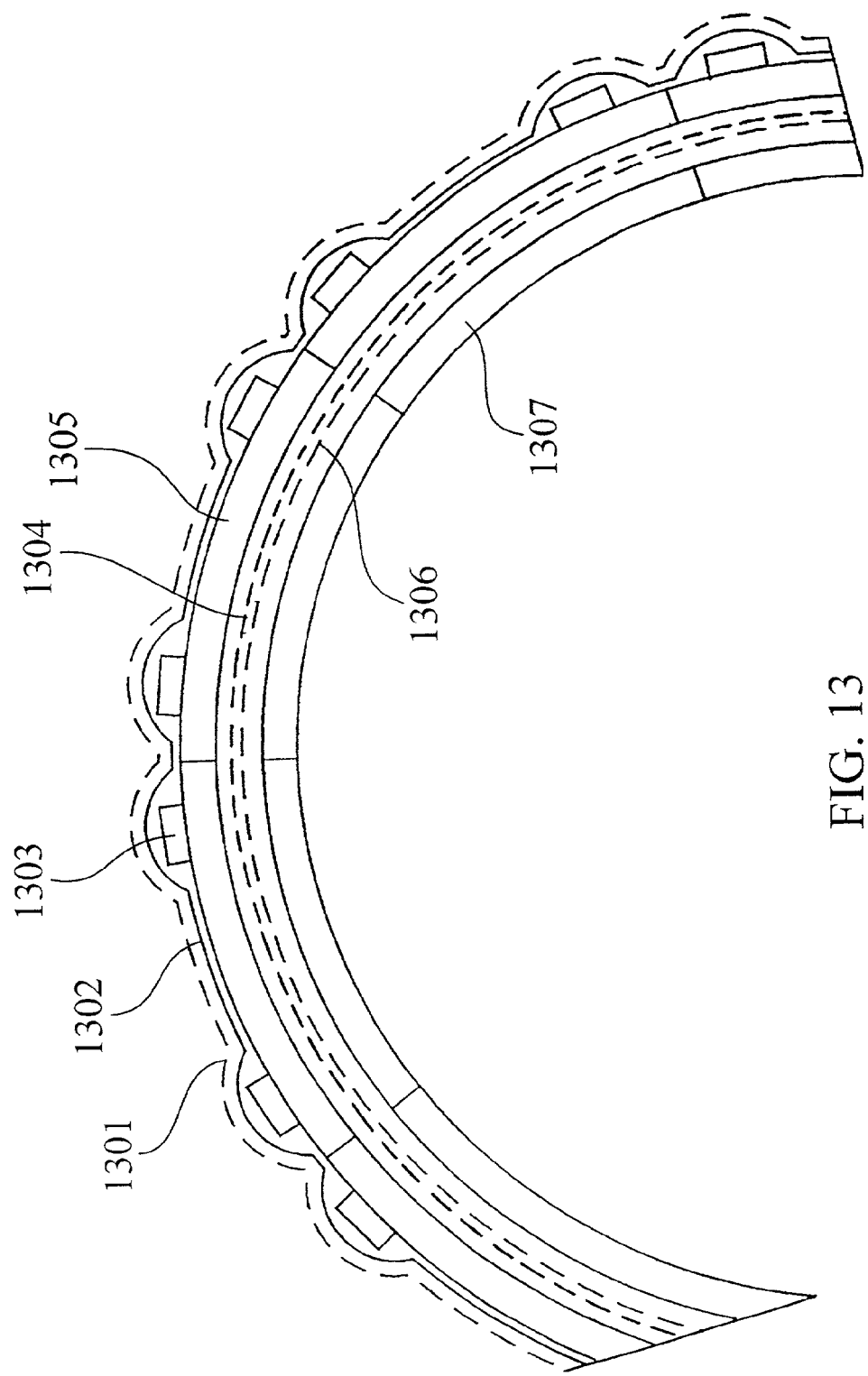

FIG. 13: Representative cross section of the apparatus thermal insulation and Faraday protections.

Figure 14:
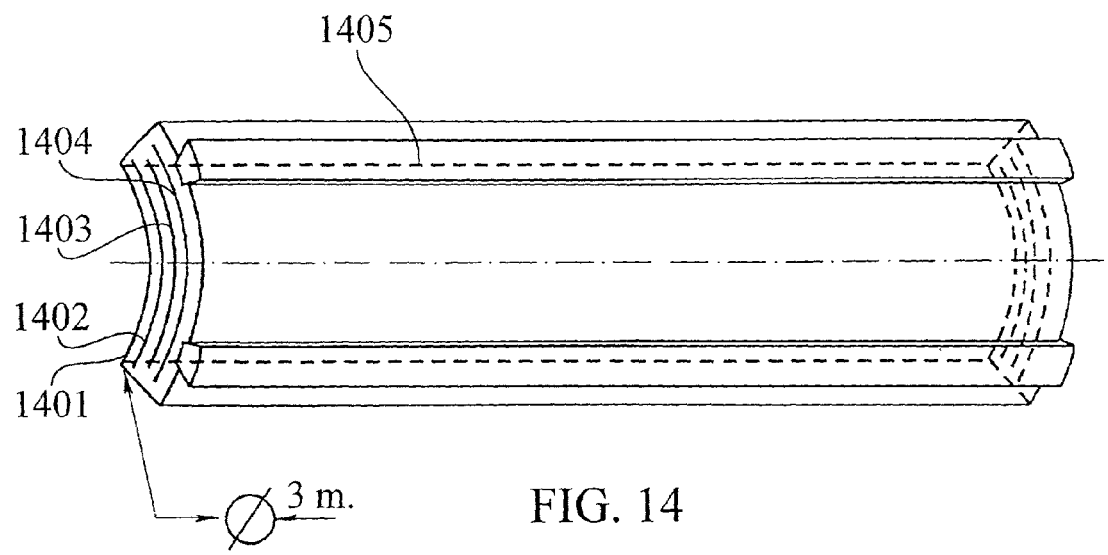
Figure 15:
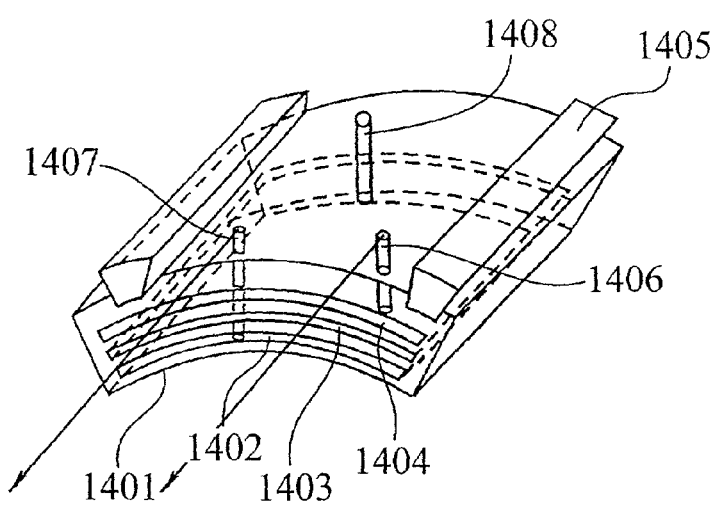

FIGS. 14 and 15: Perspective views of a module of the inner wall of the reactor.

Figure 16:
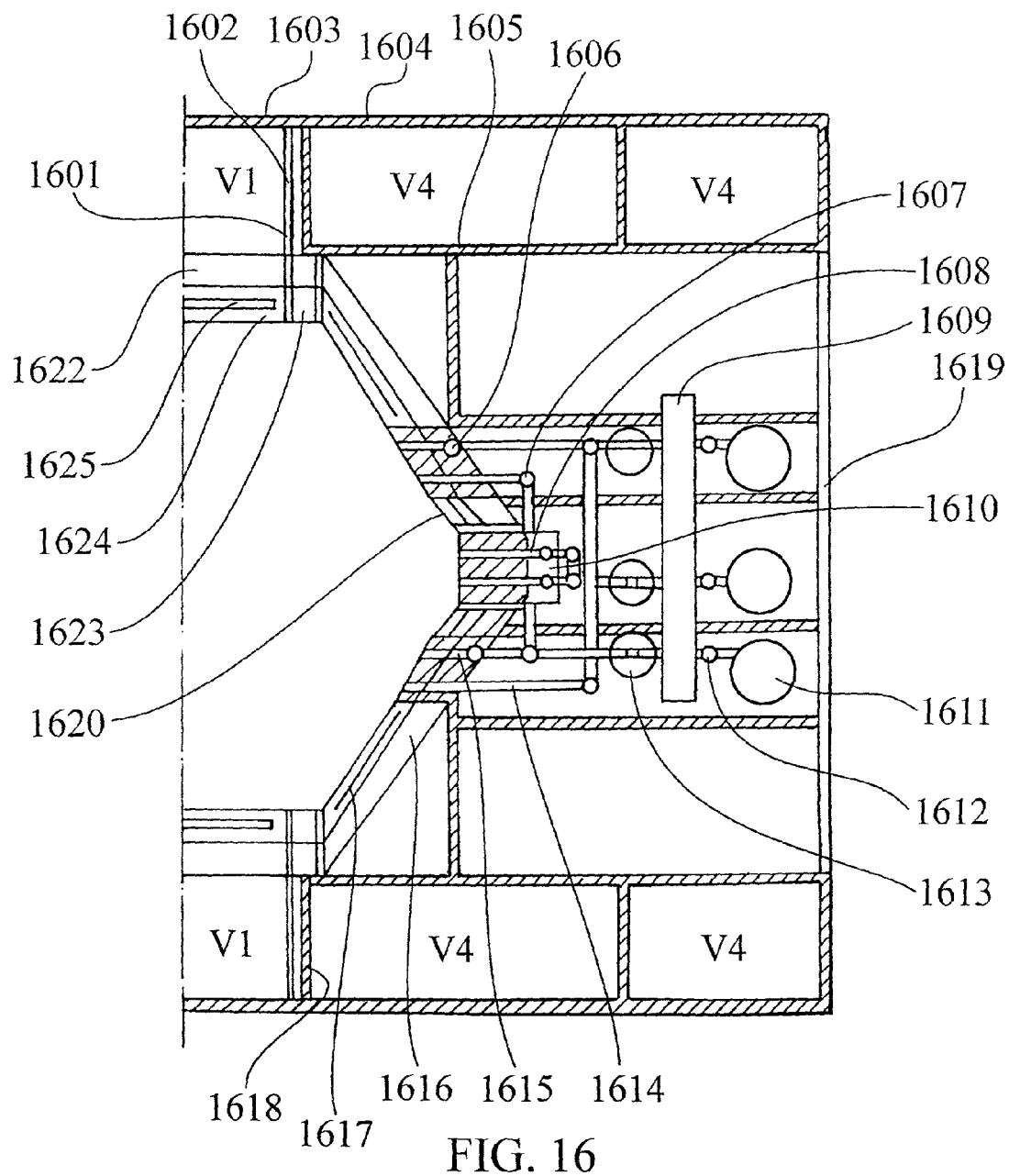
Figure 17:
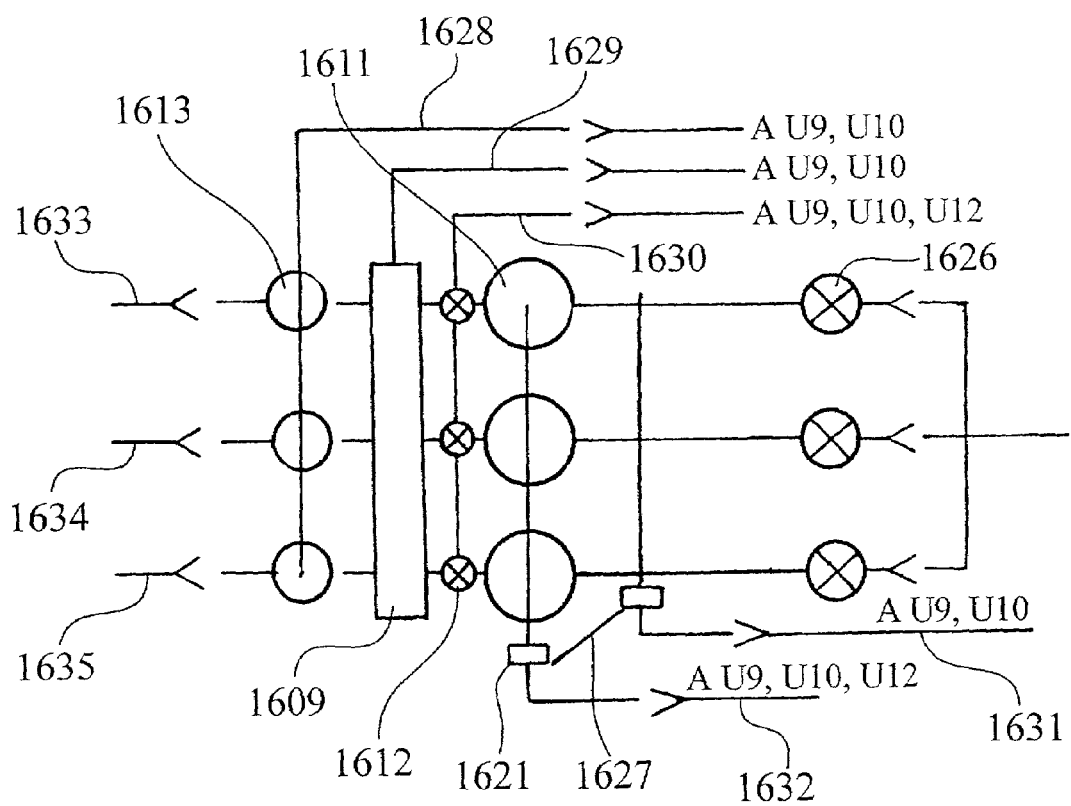

FIGS. 16 and 17: Schematic details of the injector compartment.

Figure 18:
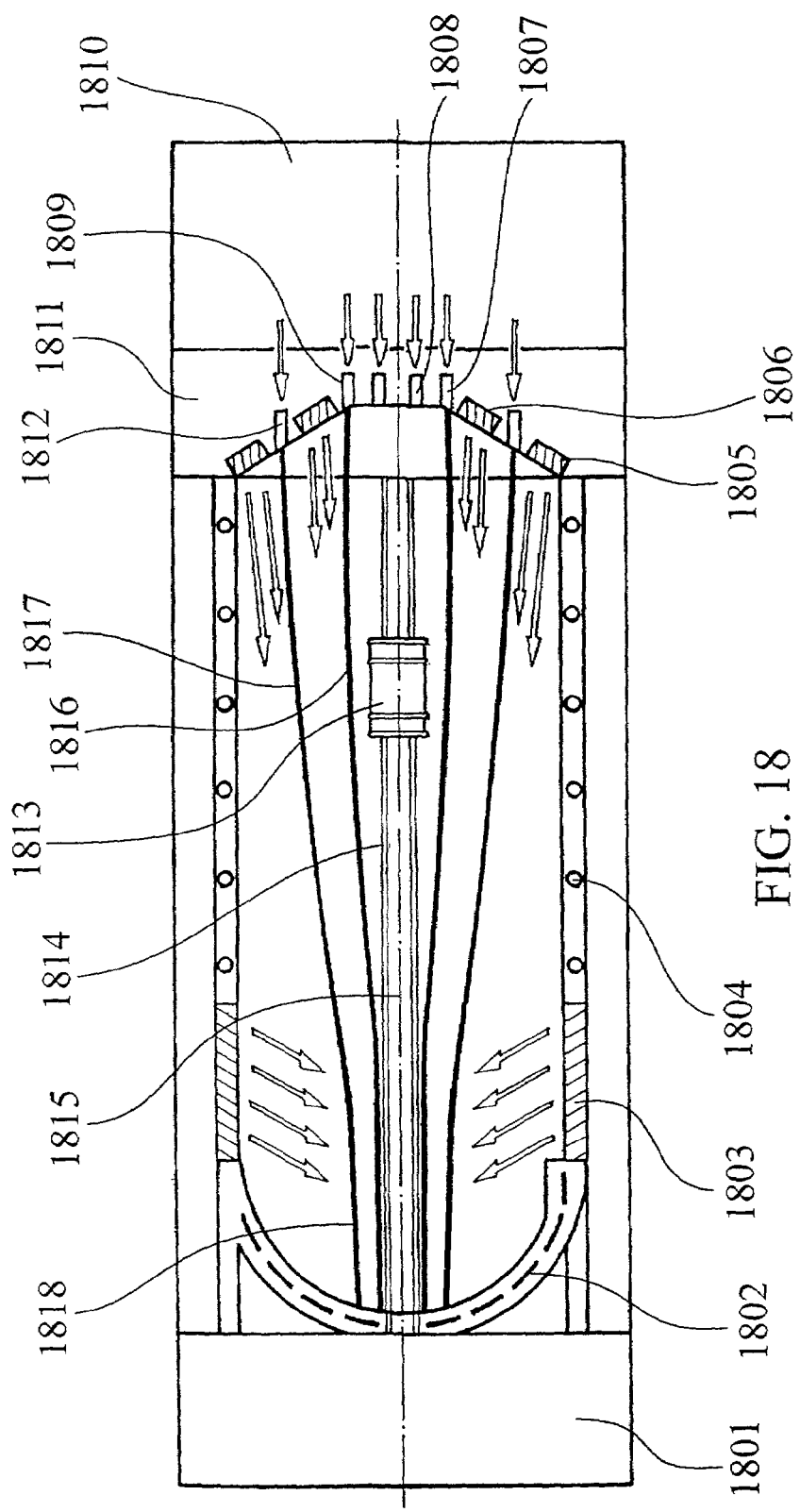
Figure 19:
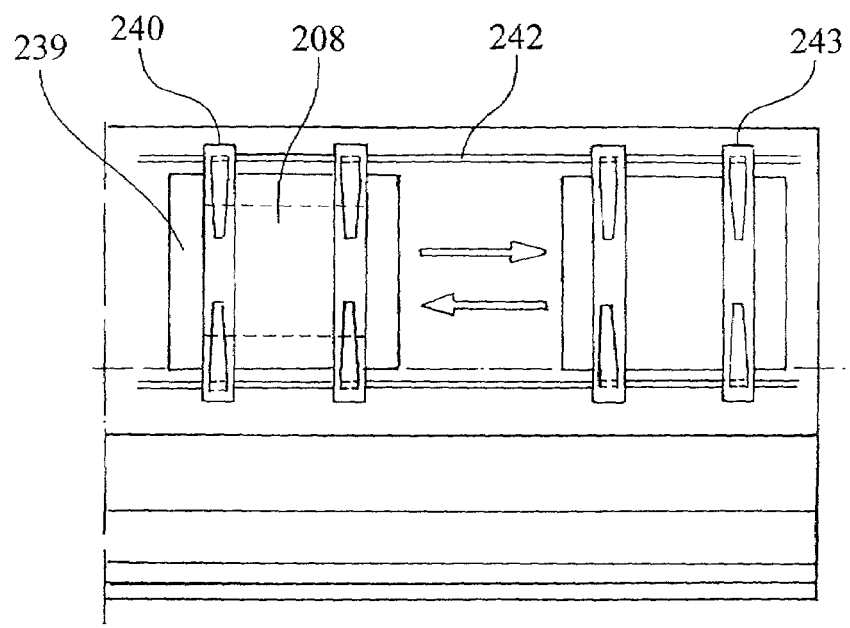
Figure 20:
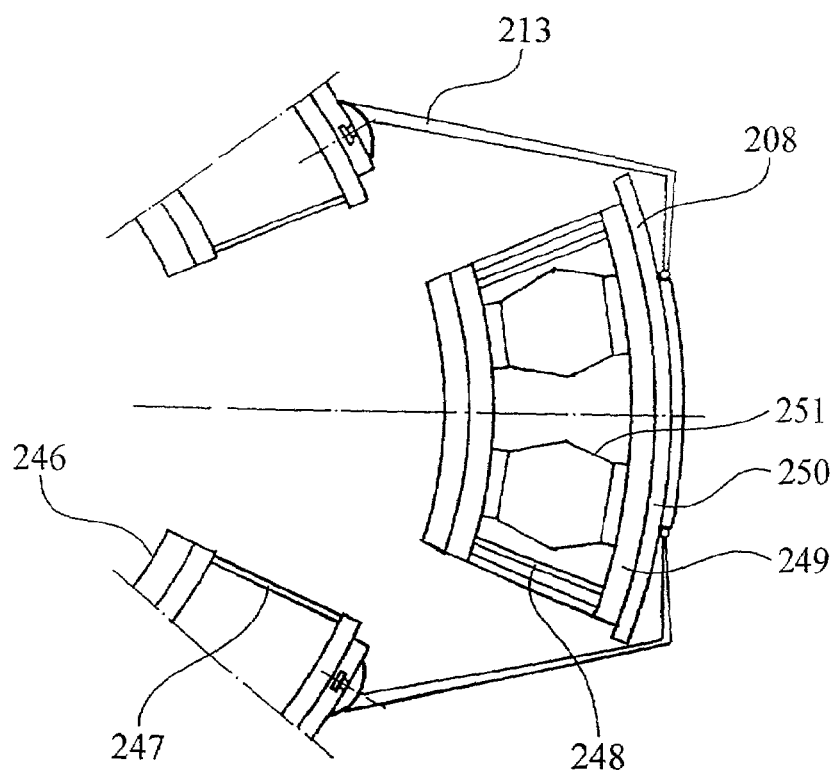
Figure 21:
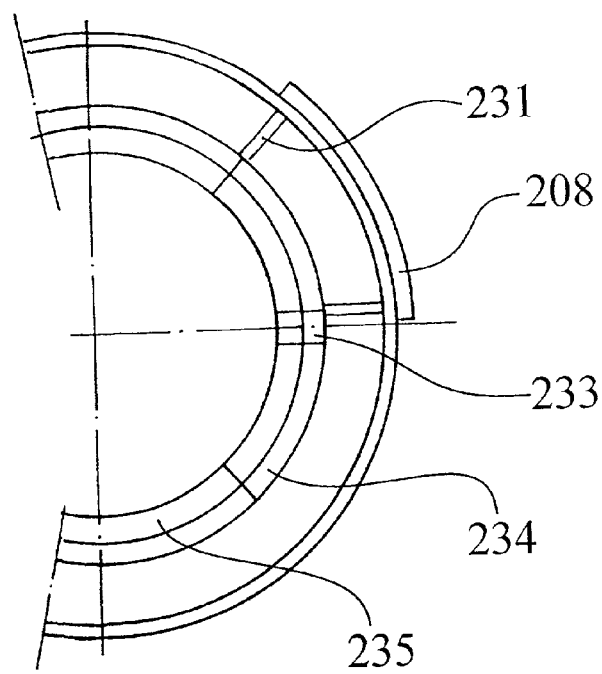
Figure 22:
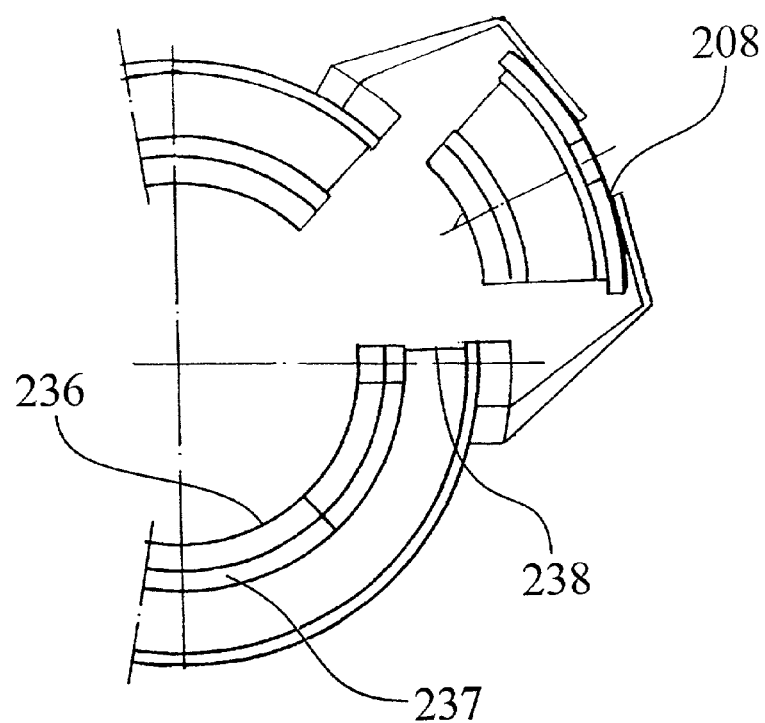

FIG. 18: concentric plasma core configuration.

FIGS. 19–22: Details of the loading door or hatch, which include RF, cooling and other various mechanisms and sensors.

The method, object of this invention, is intended especially for the total destruction by dissociation of the drum/canisters and its full content. For example drums in which this type of waste has conventionally been kept, will be processed within the following protocol and steps:

To evaluate samples of each drum/canister before initialising the treatment, in order to determine the compatibility of the product to be neutralized and the apparatus characteristics, in a mean of procedure and safety protocols.

To prepare each drum/canister by means of metallic annular brackets surrounding the drum at its end. Said annular metallic brackets will then have the following function: A) Increasing the metallic mass of the drum to be treated into the apparatus, creating the necessary conditions for the said drum to be held and positioned into the treatment chamber by a magnetic rail, in a manner to avoid any contact between the drum and the inner chamber's walls; B) integrating means of synchronized and sudden opening/dislocation over the drum envelope, preferably by means of an explosive device meant to trigger a series of a controlled micro explosions, in order to avoid any risk of explosion of the above mentioned drum within the treatment chamber, which micro explosion will a provoke the aperture, dismantlement and disintegration of the said drum's envelope in a manner to properly direct the flow of the material to be dissociated within the plasma core vortex.

To eventually use an array of disposable support/brackets instead of a magnetic sustentation.

To expose the drum/canister inside the treatment chamber to an R F coupled and MHD controlled plasma, at the temperature ranging from 8000 to 14000 degrees K, over a short period of time, but which could be variable (1 to 6 seconds), depending of the characteristic of waste to be dissociated.

To use a dopant elements, such as (but not limited to) lanthanide, Fe, or any other metals with similar effects, and/or a mixture of other plasmagene gases such as (but not limited to) Hydrogen or Helium, in order to enhance the plasma characteristics, particularly its temperature.

To use two concentric plasma cores so called primary and secondary plasma.

The primary plasma core will surround the drum in a homogeneous manner, particularly its temperature. The secondary plasma core will surround the primary plasma vortex in order to capture into its entirety, the material to be dissociated, to keep it into the plasma flow toward the collector/separator, at a homogeneous temperature.

To use a MHD device to control the various plasma cores within the treatment chamber as follow: A) to shape the primary and secondary plasma vortex; B) to control the residence time, in order to allow the proper exposure time, at the highest temperature, the molecules to be dissociated.

To collect by specific sensors in real time analysis, the dissociated elements in order to verify the dissociation process. These devices are also part of the apparatus safety procedure.

The apparatus designed to carry out this invention is comprised essentially of the units described above, which, in their entirety, can be further understood by means of the following detailed description, which refers to the attached diagrams and drawings.

FIG. 1 shows in form of block representation, the dissociation chamber for the treatment of the drums containing the waste products to be destroyed, as well as the systems for monitoring and control, including the magneto hydrodynamic unit (MHD) and all its peripheral devices, to described later in more detail. This main unit includes the different areas for collecting gases, including the gas separator -101-, the injectors compartment -U16- and the rear compartment, -102-. It also includes the neutralization compartment, the cooling unit, and the recycling compartment and other peripheral components that make up this unit. The neutralization treatment chamber must be of a sufficient volume in order to be able to carry out its functions as an expansion chamber as well as neutralizations. The function of the main unit is focussed on the neutralization of the waste drums, the various parts making up this unit are the gas conditioning compartment, shown by number -101-, gas separator, filter area, gas compartment, main chamber which includes the RF units, its cooling and regulation system, the magnetic rail, the collector which includes its antenna, its cooling and its refrigeration system. It also contains the so-called injectors compartment, which includes all means of plasmagene gas injection devices capable of sustaining a plasma core in the conditions described above. It also contains the rear compartment which includes the neutralizer compartment in which is located the neutralizer fluid tank and its peripheral monitoring/control unit, the cooling unit, the recycling compartment, which includes all the safety units and their monitoring/control means, the dopant fluid tank, and the plasmagene tank. The RF unit will be embedded in the inner wall, which is designed as a "module" in such a manner that it can be removed from the chamber for maintenance and inspection. Unit 1 includes a loading hatch that will possess its own RF and cooling unit and peripherals. Incorporated in Unit 1 is Unit 10, which is a control and maintenance unit and which will perform the following tasks:

Control/monitoring of all vacuum lines -V1-, -V2-, -V3-, -V4-, -V5-, -V6-, -V7-, shown in FIGS. 3 and 4.

Control/monitoring of the cooling unit and all its peripheral monitoring systems, gauges and fluid control (FIGS. 5,6)

Control/monitoring of the collector unit and its peripheral systems (FIGS. 3, 8)

Control/monitoring of the neutralizer unit and its peripherals. (FIGS. 3, 6)

Control/monitoring of the recycling compartment (FIGS. 3, 5).

Control/monitoring of the hatch unit and its peripheral (FIGS. 3, 12).

Control/monitoring of the plasma, from ignition to the plasmagene gas flow, as well as the plasma temperature, and shape, which includes all the devices related to the control/monitoring of the said tasks.

Control/monitoring of the magneto hydrodynamic unit (MHD) and all its peripheral related devices (cooling, magnets, power supply).

Control/monitoring of the radio frequency transmission antenna and all peripheral related devices (cooling, power supply).

Control/monitoring of the structure in the event of a structure or inner walls failure, or any other mainframe and external wall integrity, including all the devices related to the said control/monitoring.

Control/monitoring of the all the working procedures of the apparatus, including the safety/inventory procedures.

Control/monitoring of the "on line" waste neutralisation analysis including all its peripheral related devices and safety procedures.

Control/monitoring of the tractor gears which allow the apparatus mobility on site (if required).

Control/monitoring of the inner wall, its integrity as well as the collector material, in the event that a material molecular dynamic (material structural property modification) occurs in a super hostile environment (due to the high temperature chemistry effect), including any leak associated with such effect or any other failure that may could affect the integrity of the apparatus.

Control/monitoring of the detection of leaks of any fluid, liquid, gaseous of all kinds related to the safety procedure.

The following additional components must be pointed out on FIG. 1: the cooling control unit -103-, which interacts with the other units explained here; the radio frequency control unit, number -104-, likewise interacts with other units; connection -105- indicates the interrelation with units -U1- and -U10-; number -106- represents the connection of -U5- with -U1- -U14-; number -107- represents the connection to the data base; number -108- shows the connection to units -U1- and -U13-; number -109- indicates the connection to the safety and reinforcement functions and number -110- shows the connection to the data base of unit -U15-.

In the FIGS. 2 and 2.1, the external structure of the main unit can be seen. The main points are unit -201-, the front door block; the compressor/gas separator compartment -202-; the compartment structure of the coupling unit -203-; the collector compartment -204-; the compartment structure of the coupling unit -205-, the sliding rails for the front door opening -206-; the loading door/hatch for the drums -207- with door -208- and the sliding rail for the door -209-. The number -210- represents the external wall, or so-called sleeve of the apparatus and numbers -211-, -212-, and -213 show, respectively, two structue-coupling elements, and the rear sliding rails. Number -214- represents the rear door of the rear compartment. Numbers -215-, -216- and -217- respectively, represent hydraulic units.

Numbers -218- and -219- respectively represent elements of the mainframe structure and the apparatus main bracket.

Number -220- represents the loading door/hatch mechanism and number -221- represents another bracket supporting the main apparatus structure. The loading door/hatch is activated by means of a hydraulic/pneumatic unit -222-. A support of the main structure is indicated by number -223-; numbers -224-, -225- and -226- respectively also indicate hydraulic units. The rear door is attached to a sliding rail -227- and the front-end door to sliding rail -228-. The front-end door is represented by number -229- in FIG. 2 bis, in which the shock absorbers can also be observed -230-.

FIG. 3 depicts a longitudinal section of the main chamber in which the gas separator area may be localized -301-; the various gas tanks -302- in which the gasses are separated; the filter area -303-; the gas intake -304-; the area of the magneto hydrodynamic array -305-; the wall structure 306-: the frame structure -307-; the structure of the external wall -308-; the magnetic rail -309-; the radio frequency antenna -310-; the inner walls -311-; the injectors compartment -312-; the rear compartment -313-; the collector -314-; as well as its embedded antenna -315- and the magneto hydrodynamic area -316-; the loading area is also visible -317- the main frame supporting structure -318-; the radio frequency antenna (RF) -319-; the compressors compartment -320-; the radio frequency antenna cooling lines -321-; the magneto dynamic array cooling line -322- and units -323- of the tractor gears, which allow additional ground mobility to the apparatus. In the same figure, it is possible to observe the so-called rear compartment -313- which contains the neutralization, recycling and cooling units and other various controlling regulation systems.

Different vacuum areas have been indicated in this figure by -V1- to -V6-.

FIG. 4 is a diagram of the conditioning and recycling vacuums; unit -503- that detects eventual contamination; the compressor -404- and its compartment -405-; number -406- represents the interfaces from all the door seal devices, in the event of any chemical leak occur, to the detector/analyzer units, which is part of the safety apparatus procedure.

-E1- to -E10- depict the electronic remote control circuits and -EV1- (stands for Electro Valves) to -EV8- depict the different electromagnetic valves. The vacuum pumps have been named -VP- and the fluid pumps have been named -FP-. The gas separator compartment has been called -GCC- and the injectors compartment has been abbreviated -IC-. Number -406- represents the connection to the electronic remote control circuits and connection -407- is the electronic valve interface.

FIG. 5 shows a detailed diagram of the monitoring system and the gas and fluid control which does not include the cooling lines.

In the above-mentioned figure -V1- to -V6- represent the vacuum areas, -T1- and -T2- indicate the tanks compartment and the -AR- (Argon) tank respectively, with -F- representing the fluids and -F1- the neutralizer. -F2- corresponds to the hot fluid -F3-. -F4-is the plasmagene gasses; -U1- indicates the main unit; -U9- is the main control and -U10- is the control unit of -U1-. Number -501- indicates the rear compartment; number -502- is the gas compartment; number -503- is the neutralization compartment; number -505- is the mixer; number -506- is the shunt or bypass and -507- is another mixer. The abbreviation -NC- indicates the neutralization compartment; and -CC- is the compressor compartment; the abbreviation -NT- is the neutralizer fluid tank and -CU- is the cooling unit.

Likewise, number -508- indicates the emergency dump; number -509- is the outlet to the unit -U9-, and numbers -510- to -513- are the interfaces to the control sensors; number -514- is the interface to the mass spectrometer or alike; number -515- represents the interface to the chromatograph or alike; number -516- is the interface to the environment analyzer; number -517- is the collector monitor unit; number -519- monitors the radio R F/magneto hydrodynamic process monitor; and number -522- monitors and controls the reactor wall structure and its integrity.

FIGS. 6 and 6 BIS represent a detail of the rear compartment with a section, number -601- shows the unit which controls and monitors the decontamination process; number -602- is the recycling container; number -603- is the dopant fluid tank; number -604- is the plasmagene gas tank; number -605- is the cooling unit; number -606- is the cooling compartment; number -607- is the neutralization compartment; number -608- is the neutralization fluid tank and number -609- is the injectors' compartment.

With the use of the same abbreviations as the above-mentioned ones, the vacuum areas have been labeled (V), the fluid pumps (FP) and the main unit (U1).

FIG. 7 is a general diagram of the cooling circuits of the apparatus of this invention, in which it is possible to see the main unit (-U1-) and the array of cooling circuits. To the main unit (-U1-) are attached cooling lines -733- and -734- of the magneto dynamic unit and the other lines -735- and -736- from the RF unit which successively lead to a monitoring and controlling unit such as the one which is indicated by number -701- (the others have not been numbered for clarity purposes), after which and via electromagnetic valves -703- and -704-, lead to cooling array by means of monitoring control units -702- and electro valves -705-, towards other cooling units such as cooling unit -706- in which there is a coolant tank -707- a cooling compressor -708- and a heat exchanger unit -709-. The circuitry contains cooling fluid pumps such as those indicated by numbers -710- and -711- as well as other regulating mechanisms, interfaces, pumps and electro valves for the rest of the circuits, which have not been depicted in the diagram. The cooling unit also includes a cooling array -726- embedded into the collector -727-, which is connected by means of electro valve -728- to line -732-, which together with line -733- complete the cooling loop of the previously indicated outlets.

FIG. 8 depicts the collector and the surrounding bracket -801- with the external structure -802- and the R F antenna -803-, embedded into the inner wall -804-. It is equally possible to observe the rear gas deflectors -805- and the plasma vortex, which is also represented, with its rear or its tail section -806-. The pathway the elements under the dissociation process, is also represented -807- and the area of the surrounding body of the hyper filter -808-. It is also possible to see, in -809- and -810-, each element of the structure and number -811- represents the internal supporting bracket. The collector, which includes an array of embed, inductive antenna -812- and a cooling line -813-, as well as a feeder -815-. It is also possible to observe the internal wall support/structure -815- as well as the inner surface -816- of the collector itself. Number -817- represents the magneto hydrodynamic unit area and -818- represents the RF area. Numbers -819- and -820- respectively represent the structure and the support of the collector/separator.

FIG. 9 is a diagram of one of a so-called module, part of the main chamber, in which it is possible to see the RF antenna -901- embedded into the inner wall -902- of the module. The module shows the hatch opening -903-, which shall be part of the mechanism of the said hatch area as, indicated by number -904-. In the same manner, it is possible to observe the magnetic rail -905-, which shall in turn, hold the waste container/drum to be processed. Number -906- represents the opening for the insertion of the door.

FIG. 10 is a diagram of the make-up of the section of the main chamber. The above-mentioned figure depicts the elements, which make up the chamber including the external wall so-called sleeve -1002- with a frame structure -1003- for the same external wall and main frame -1004- and -1005- with the rollers -1001- in between. The structure has beams -1006- and a bracket -1007- to hold the inner wall. The connection between the external wall and the inner wall of the chamber is made by means of control units, so-called controller -1008- with its own bracket -1009-. There is also an optical device -1010- for an optical alignment of the inner wall, said controller is actuated by a linear motor -1011-. The controller possesses articulated arms -1012-.

Numbers -1013- and -1014- respectively represent the RF power line feeder and the RF antenna. Number -1015- represents a bracket for the inner wall control, numbers -1016- and -1017- respectively represent the mainframe and external wall rails that allow the sliding out of the so-called sleeves, for maintenance purposes.

Number -1018- represents the set up of the external wall support and number -1019- it the supporting rail of the said inner wall -1020-.

The cooling line is represented in -1021- and the linear motor control (not represented) is in -1022-.

Number -1023- represents various sections, which make up the inner wall, which are interchangeable, as a module. Number -1024- and -1025 respectively represents the upper and lower RF cooling units -, the inner wall is represented by -1026-.

Sections of the frame structure have been detailed in FIGS. 11 and 12. In particular, FIG. 11 depicts the external wall -1101-, the inner wall -1111- control -1102-; -the structure of the external wall -1103-; the main frame -1104-, a beam -1105 and a control -1106- of an harm controller -1107- as well as the magnetic rail within the inner wall -1108- and the groove of the set up of the inner wall bracket -1109-. It is also possible to observe the inner wall bracket -1110- as well as the bracket controller -1112- and the mechanism -1113- of the controller itself.

FIG. 12 represents the rail -1201- of the external wall, -1202-, the frame -1203- of the external wall itself and a roller -1204- as well as a groove -1205- for the roller in the main frame -1206-. It is equally possible to observe the harm mechanism -1207-, which control the inner wall -1210- and its control mechanism -1208- as well as control harm -1209-. The set up of the internal wall bracket -1212- and the groove of the inner wall support -1212- as well as the rail -1213- of the inner wall and the linear motor actuator -14-, may also be observed.

FIG. 13 represents a diagram of the apparatus thermal insulation and the Faraday net protection, surrounding the inner wall bracket, -1301- being the representation of the external Faraday net protector and -1302- the external thermal insulator as well as controller bracket -1303-. Number -1304-, represents the internal insulator, the inner wall bracket is numbered -1305-. The insulation of the internal wall -1305- and the internal Faraday net is numbered -1306-. The chamber's inner wall is made by mean of various similar modules -1307-.

FIGS. 14 and 15 are a diagram of a module of the inner wall of the reactor. This module makes up part of the inner wall represented by number -1401- including the cooling line. -1402- and the R F antenna, embedded into the aforementioned part of the inner wall -1403-. Cooling line -1402- corresponds to the internal part and cooling line -1404- corresponds to the external part. Number -1405- represents the rails of the module and number -1406- represents the upper cooling line feeder and number -1407- represents lower cooling pipe feeder. Number -1408- represents the feeder for the R F antenna in the diagram.

FIGS. 16 and 17 are a diagrammatic views explaining the injectors set up of this said invention.

Although the number of injectors may vary, the diagrams only depict three set of them, with a structural (gasses, fluid leak proof) separator -1601-, which establishes the limits of the injectors' compartment as well as the separator -1602- and the external wall -1603- and the external structure -1604-. Number -1605- represents a diagram of the structure of the injectors' compartment and number -1606- the manifold that contains the injectors (in this example there are three).

Number 1607 represents a plasmagene gas manifold, number -1608- is a central injector and number -1609- depicts a gas flow control. Number -1610- is the second central injector manifold and number -11- is one of the three gas pressured tanks, to individually feed the injectors. Each individual gas tank is fuelled through a pump -1612- for gas to a gas pressure regulator -1613- and to a collector -1614-.

The injectors' manifold is also represented -1615- and its brackets -1616- for the magneto hydrodynamic unit -1617-. The injectors' compartment is supported by a structure -1618- and attached to the main frame -1619-.

The same diagram depicts another magneto hydrodynamic unit -1620- its monitoring and control unit -1621-.

The inner wall has a bracket -1622- and a separator/insulator -1623- of the same inner wall 1624-.

The RF antenna misrepresented in a diagram by number -1625-.

It is possible to see from said FIG. 16 that the gas will come from a main external tank which has not been depicted through the pumps -1626, which will be the same in number as the plasmagene gas tanks -1611- and the gasses injection device. -1627- represents a control unit for the plasmagene gas admission. In the same figure, the connections -1628- to units -U9- and -U10-, -1629- to units -U9- and -U10-, -1630- to units -U9-, -U10- and -U12-, -1631- to units -U9- and -U10_and -1632- to units -U9-, -U10- and -U12- have also been represented. Connections -1633-, -1634-, and -1635- to the respective injectors may also be observed. Anything that does not affect, alter, change or modify the essence of the described procedure will be variable with a view to this invention.

FIG. 18 show the concentric plasma core configuration showing the gasses separator compartment -1801-; the collector -1802-, a MHD device for the control of the time of residence of the materials in process to be dissociated, and exposed to thermal radiation; -1804-RF antenna; -1805- MHD device for the control of the shape of the secondary plasma; -1806- MHD control for the shape of the primary plasma; -1807-, -1808- and -1809- injectors for the plasmagene gasses; -1810- the rear compartment of the dissociating chamber; -1811- injector compartment; -1812- plasmagene gasses injector; -1813- drum/canister; -1814- magnetic rail; -1815- primary plasma tail or NLTE ( Non Local Thermal Equilibrium); -1817- secondary plasma core vortex or LTE (Local Thermal Equilibrium); -1817-secondary plasma core vortex or LTE; and -1818-secondary plasma tail or NLTE.

In FIGS. 19 to 22, the various elements for the control of the door or the hatch for the loading of the drums/canisters inside of the treatment chamber, are to be seen.

In these figures, it is possible to see the double membrane of the internal sealing unit (231); the external (vacuum) sealing unit (232); the magnetic rail (233) and the brackets (236 and 237) of the inner wall modules (234 and 235). A double membrane of the sealing unit (238) is to be seen in both FIGS. 2.5 and 2.3, as well as the external vacuum (9) sealing unit (239).

A carrier (240) will have the capability to hold the door or hatch (208), permitting it to slide along the external structure (212) and together, with the crane unit (243), hold the door as shown in FIGS. 2.3 and 2.5. Also to be seen in these figures, are the external wall (244) and the double membrane (internal) from the sealing unit (245), as well as the inner wall (246) of the of the reactor chamber and the double membrane (internal) of the sealing unit (247).

The hatch (208) will be composed of an internal structure and external structure (249), connected by a structural means so-called controller, as also referred to in FIG. 10 (248) and connecting arms (241).

Also to be seen in these figures are the external sealing unit (vacuum) (250) and the double membrane of the said sealing unit (252).

The dimensions, which appear in meters and feet in some of the figures are only for the illustrative purposes and are not meant for any limitation of this invention.

Although the present invention has been described in connection with the embodiment which has been shown and discussed in detail thereabove, it is to be understood that any ordinary expert in the matter will find many ways, after understanding all material contained in the description claims and drawings of the present patent application, to introduce improvements and modifications which will not depart from the scope of the present invention as defined in the following claims.

The invention claimed is:

1. An apparatus for neutralizing and dissociate waste that is contained in a container comprising:
a housing that is configured such that the apparatus is a single transportable unit;
a dissociation chamber for the treatment of the container containing the waste, the chamber being configured and sized to receive and hold the container, the chamber having a plasma core generated therein and being defined as an RF coupled plasma, the chamber including a feature to manipulate the flow of the plasma such that it flows completely around the container and flows at a temperature greater than 8,000° K in order to cause a dissociation of the container and the waste contained therein, the chamber including a collector/separator area for individually and selectively collecting by species various materials resulting from the dissociation of the container and waste, the species being transported by means of the plasma flow in the chamber
an RF generator unit for generating sufficient power at the selected frequency to generate and maintain the plasma core in the chamber and a array of RF antennas that are embedded in a wall that defines the dissociation chamber for emitting the selected radio frequency to cause dissociation of the container and its waste due to the plasma core engulfing the container and its contents;
a robotic unit for loading one or more containers that hold the waste into the dissociation chamber, the robotic unit being configured so that it recognizes and selects the proper container that is to be dissociated, the robotic unit being in communication with a database to permit inventorying prior to disassociation of the container and waste;
a cooling unit associated with the chamber that serves to maintain a temperature gradient of at least the embedded RF antennas and optionally other components below a predetermined temperature in order to maintain the functional characteristics of the walls of the chamber and RF antennas; and
wherein after the container is opened, the waste material is caused to flow through the plasma core as opposed to flowing around it to ensure complete dissociation.

2. The apparatus of claim 1, wherein the dissociation chamber is formed by a combination of an external surrounding wall and an internal wall that are individual modules that are fitted together with a main frame of the housing and interrelated by an articulated connection system which is activated by controllers that function to tightly secure the internal wall.

3. The apparatus of claim 2, wherein the controllers are linear motors.

4. The apparatus of claim 2, wherein both of the external and internal walls have independent cooling circuits embedded therein and form a part of the cooling unit.

5. The apparatus of claim 1, wherein the plasma core is formed of a primary plasma core that surrounds the container at homogenous temperature and a secondary plasma core that surrounds the primary plasma core in order to capture material to be dissociated and to keep the material in the plasma flow toward the collector/separator area and at a homogenous temperature.

6. The apparatus of claim 1, further including:
a plasmagene gas injection device that is operable in combination with the RF generator unit to generate the plasma core in the dissociation chamber, the plasmagene gas injection device including a plasmagene gas source and injectors to introduce the gas into the dissociation chamber; and
a waste particles collector,
wherein the plasmagene gas injection device includes a carrier, with each of the carrier, the waste particles collector and walls that define the dissociation chamber containing a cooling unit and an RF antenna embedded therein to generate and control RF propagation.

7. The apparatus of claim 6, wherein the walls of the dissociation chamber are made of a material that is transparent to RF radiation.

8. The apparatus of claim 6, wherein the walls of the dissociation chamber are formed of Beryllium Oxide.

9. The apparatus of claim 1, further including:
a magneto hydrodynamic unit that operates to control a shape of the plasma core and to control a residence time of the material to be dissociated in the chamber where it is exposed to the plasma core, the residence time being sufficient to cause complete dissociation in gas phase of the container and the waste contained therein.

10. The apparatus of claim 1, further including:
a plasmagene gas injection device that is operable in conjunction with the RF generator unit to generate the plasma core in the dissociation chamber, the plasmagene gas injection device including a plasmagene gas source and injectors to introduce the gas into the dissociation chamber;
a waste particles collector; and
a magneto hydrodynamic unit that operates to control a shape of the plasma core and to control a residence time of the material to be dissociated in the chamber where it is exposed to the plasma core, the residence time being sufficient to cause complete dissociation of the container and the waste contained therein,
wherein the magneto hydrodynamic unit is disposed approximity the plasmagene gas injection device and the waste particles collector.

11. The apparatus of claim 10, wherein the magneto hydrodynamic unit includes an array of plasmagene gas tanks that are fed from a central external tank and each of the plasmagene gas tanks is supplying the plasmagene gas to the injection device by means of a gas flux controller and by a gas stream regulator for each individual injector.

12. The apparatus of claim 11, wherein the dissociation chamber contains an access door for the full automated loading of the container, the access door including its own cooling means and an RF antenna array unit and associated monitoring means.

13. The apparatus of claim 11, wherein the predetermined temperature is 600° C.

14. The apparatus of claim 11, further including at least one dopant element introduced into the dissociation chamber that enhances a characteristic of the plasma core.

15. The apparatus of claim 14, wherein the characteristic comprises a temperature of the plasma core.

16. The apparatus of claim 1, further including:
annular metal brackets that surround the container at its ends; and
means for generating a series of controlled micro explosions to assist in dismantling the container and exposing the waste in such a manner to properly direct the flow of the waste which is to be dissociated within the plasma core.

* * * * *